US011814056B2

(12) United States Patent
Sakai et al.

(10) Patent No.: US 11,814,056 B2
(45) Date of Patent: Nov. 14, 2023

(54) TRAVEL AMOUNT ESTIMATION APPARATUS

(71) Applicant: FAURECIA CLARION ELECTRONICS CO., LTD., Saitama (JP)

(72) Inventors: Takahiro Sakai, Tokyo (JP); Morihiko Sakano, Tokyo (JP); Daisuke Fukuda, Saitama (JP); Junya Murayama, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 211 days.

(21) Appl. No.: 17/418,167

(22) PCT Filed: Oct. 17, 2019

(86) PCT No.: PCT/JP2019/040970
§ 371 (c)(1),
(2) Date: Jun. 24, 2021

(87) PCT Pub. No.: WO2020/137110
PCT Pub. Date: Jul. 2, 2020

(65) Prior Publication Data
US 2022/0073084 A1    Mar. 10, 2022

(30) Foreign Application Priority Data

Dec. 27, 2018    (JP) .................................. 2018-244190

(51) Int. Cl.
*B60W 40/00*    (2006.01)
*B60W 40/10*    (2012.01)
*G06T 7/20*    (2017.01)

(52) U.S. Cl.
CPC ............... *B60W 40/10* (2013.01); *G06T 7/20* (2013.01); *B60W 2420/42* (2013.01);
(Continued)

(58) Field of Classification Search
CPC ............. B60W 40/10; B60W 2420/42; B60W 2720/106; G06T 7/20; G06T 2207/10016; G06T 2207/30252
(Continued)

(56) References Cited

U.S. PATENT DOCUMENTS

2009/0093924 A1* 4/2009  Aso ....................... B60W 40/10
                                                                 701/31.4
2020/0331499 A1* 10/2020 Watanabe .......... B60W 60/0025

FOREIGN PATENT DOCUMENTS

JP    2005-315746 A    11/2005
JP    2009-74859 A    4/2009
(Continued)

OTHER PUBLICATIONS

International Search Report w/English translation and Written Opinion of PCT/JP2019/040970, dated Dec. 10, 2019, 11 pages, Reviewed only translated portions.
(Continued)

*Primary Examiner* — Tyler J Lee
*Assistant Examiner* — Tiffany P Ohman
(74) *Attorney, Agent, or Firm* — REISING ETHINGTON, P.C.

(57) ABSTRACT

A travel amount estimation apparatus includes a vehicle travel amount calculation unit, a sensor travel amount calculation unit, an error cause determination unit, and a vehicle travel amount correction unit. The vehicle travel amount calculation unit acquires vehicle information and calculates a vehicle travel amount based on the vehicle information. The sensor travel amount calculation unit (Continued)

acquires sensor information from an external sensor and calculates a sensor travel amount based on the sensor information. The error cause determination unit determines an error cause of the vehicle travel amount. The vehicle travel amount correction unit corrects the vehicle travel amount by using the sensor travel amount in accordance with the error cause and estimates a travel amount of the vehicle on which it is mounted.

11 Claims, 13 Drawing Sheets

(52) U.S. Cl.
CPC ............... *B60W 2720/106* (2013.01); *G06T 2207/10016* (2013.01); *G06T 2207/30252* (2013.01)

(58) Field of Classification Search
USPC .......................................................... 701/70
See application file for complete search history.

(56) References Cited

FOREIGN PATENT DOCUMENTS

| JP | 2013-214143 A | 10/2013 |
| JP | 2017-10539 A | 1/2017 |
| JP | 2018-24294 A | 2/2018 |
| WO | WO 2015/125298 A1 | 8/2015 |

OTHER PUBLICATIONS

Office Action issued by the Japanese Patent Office for JP2018-244190 dated Aug. 16, 2022; 4 pages, Reviewed English Translation Version Only.

English Translation of the office Action issued by the Japanese Patent Office for JP2018-244190 dated Aug. 16, 2022; 4 pages.

* cited by examiner

FIG. 8

| FRAME NUMBER | TURN | LEVEL DIFFERENCE | CORRECTION INFORMATION |
|---|---|---|---|
| 1 | 0 | 0 | 0 |
| 2 | 0 | 0 | 0 |
| 3 | 1 | 0 | 0 |
| 4 | 1 | 0 | 1 |
| ⋮ | | | |
| ⋮ | | | |
| N | 0 | 1 | 1 |

0:NO  1:YES

TRAVEL AMOUNT ESTIMATION APPARATUS

CROSS-REFERENCE TO RELATED APPLICATION(S)

This application is a U.S. National Phase Patent Application of International Application Number PCT/JP2019/040970, filed on Oct. 17, 2019, which claims priority of Japanese Patent Application Number 2018-244190, filed on Dec. 27, 2018, the entire content of each of which is incorporated herein by reference.

TECHNICAL FIELD

The present invention relates to a travel amount estimation apparatus.

BACKGROUND ART

An automatic parking system configured to specify a parking position of an automobile, set a path to the parking position, and cause the automobile to autonomously travel without driving operation by a driver has been disclosed. Such an automatic parking system is required to highly accurately estimate the travel amount of the traveling automobile to cause the automobile to accurately autonomously travel in accordance with the path to the parking position.

A technology disclosed in Patent Literature 1 below has been known for estimation of the travel amount of a traveling automobile. Patent Literature 1 discloses a motion measurement apparatus including an image calculation unit configured to calculate at least one of three axis angular velocities of motion of a traveling object based on a plurality of images obtained by capturing an external space of the traveling object, an angular velocity detection sensor configured to detect at least one of the three axis angular velocities of motion of the traveling object, and a motion estimator configured to estimate the at least one of the three axis angular velocities of motion of the traveling object based on the at least one of the three axis angular velocities, which is calculated by the image calculation unit and the at least one of the three axis angular velocities, which is detected by the angular velocity detection sensor.

CITATION LIST

Patent Literature

[Patent Literature 1]
Japanese Patent Laid-Open No. 2009-74859

SUMMARY OF INVENTION

Technical Problem

In a system for automatic parking involving long distance travel, a complicated path including a plurality of times of turning and K-turning in accordance with, for example, the positional relation between a parking position and a surrounding obstacle is set in some cases. In addition, a level difference such as a flap needs to be travelled over until parking completion in some cases. When the technology disclosed in Patent Literature 1 is applied to an automatic parking system, the three axis angular velocities are corrected in all scenes in which an automobile is traveling. However, long distance travel is highly likely to include a situation difficult to be handled by travel amount estimation based on a captured image, for example, a situation in which a repetition pattern such as leaves exists or a scene in which change of an illumination environment is large. When travel amount estimation based on a captured image is performed in such a scene, an obtained estimation result has a large error. Accordingly, the three axis angular velocities are corrected based on a result of travel amount estimation including an error, and it is difficult to perform accurate travel amount estimation. Thus, the accuracy of travel amount estimation performed for a vehicle autonomously traveling in accordance with a path has room for improvement.

Solution to Problem

A travel amount estimation apparatus according to the present invention includes: a vehicle travel amount calculation unit configured to acquire vehicle information related to traveling of a vehicle and calculate a vehicle travel amount indicating a travel amount of the vehicle based on the vehicle information; a sensor travel amount calculation unit configured to acquire sensor information related to a surrounding environment of the vehicle from an external sensor and calculate a sensor travel amount indicating a travel amount of the vehicle based on the sensor information; a vehicle information change point detection unit configured to detect, as a vehicle information change point, a situation in which error occurs to the vehicle travel amount based on the vehicle information; an error cause determination unit configured to determine an error cause of the vehicle travel amount by using the vehicle information change point detected by the vehicle information change point detection unit; and a vehicle travel amount correction unit configured to correct the vehicle travel amount by using the sensor travel amount in accordance with the error cause and estimate a travel amount of the vehicle.

Advantageous Effect of Invention

According to the present invention, it is possible to improve the accuracy of estimation of the travel amount of a vehicle.

BRIEF DESCRIPTION OF DRAWINGS

FIG. 8 is a diagram illustrating an exemplary error cause information table.

DESCRIPTION OF EMBODIMENTS

First Embodiment

Figure 1:
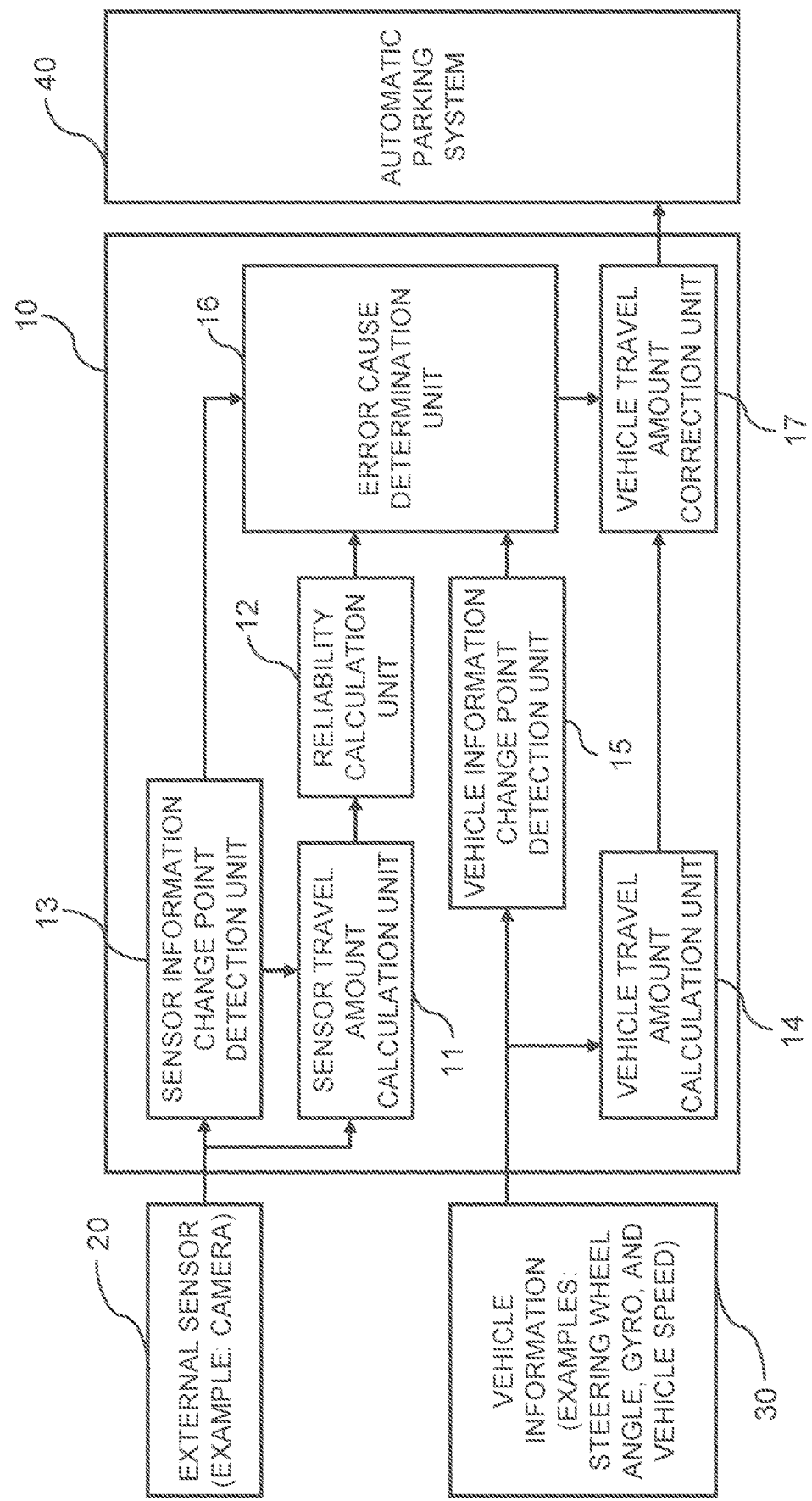
FIG. 1 is a diagram illustrating the configuration of a travel amount estimation apparatus according to an embodiment of the present invention.

FIG. 1 is a diagram illustrating the configuration of a travel amount estimation apparatus 10 according to an embodiment of the present invention. The travel amount estimation apparatus 10 illustrated in FIG. 1 is mounted on a traveling object such as a passenger vehicle and used in combination with an automatic parking system 40. Hereinafter, the traveling object on which the travel amount estimation apparatus 10 is mounted is referred to as an "own-vehicle". The travel amount estimation apparatus 10 periodically operates in a period determined in advance, for example, 100 ms.

As illustrated in FIG. 1, the travel amount estimation apparatus 10 includes, as functions thereof, a sensor travel amount calculation unit 11, a reliability calculation unit 12, a sensor information change point detection unit 13, a vehicle travel amount calculation unit 14, a vehicle information change point detection unit 15, an error cause determination unit 16, and a vehicle travel amount correction unit 17. The travel amount estimation apparatus 10 includes a CPU, a RAM, a ROM, and the like, and these functions can be achieved by loading a predetermined computer program stored in the ROM onto the RAM and executing the computer program at the CPU. Note that some or all functions of the travel amount estimation apparatus 10 may be achieved by using hardware such as an FPGA.

Sensor information acquired by an external sensor 20, and vehicle information 30 are input to the travel amount estimation apparatus 10. The external sensor 20 is a sensor mounted on the own-vehicle and capable of acquiring sensor information related to a surrounding environment of the own-vehicle, and for example, a single-lens camera, a stereo camera, a light detection and ranging (LiDAR), or a radar is used as the external sensor 20. The present embodiment describes an example in which a single-lens camera is used as the external sensor 20. In this case, images captured at a predetermined frame rate by the single-lens camera as the external sensor 20 are sequentially acquired as sensor information by the travel amount estimation apparatus 10. The vehicle information 30 is information related to traveling of the own-vehicle, which is obtained from the own-vehicle, such as information indicating, for example, the vehicle speed, the steering wheel angle, the states of acceleration and brake, and the state of the shift brake. Similarly to the sensor information, the vehicle information 30 is sequentially acquired at a predetermined frame rate by the travel amount estimation apparatus 10.

The sensor travel amount calculation unit 11 calculates the travel amount of the own-vehicle based on the sensor information sequentially acquired from the external sensor 20. Hereinafter, the travel amount of the own-vehicle, which is calculated based on the sensor information by the sensor travel amount calculation unit 11 is referred to as a "sensor travel amount". The sensor travel amount calculation unit 11 outputs an obtained calculation result of the sensor travel amount to the reliability calculation unit 12 together with an optional parameter used in the calculation. Note that when a sensor information change point to be described later is detected by the sensor information change point detection unit 13, the sensor travel amount calculation unit 11 does not perform calculation of the sensor travel amount.

The reliability calculation unit 12 calculates the reliability of the sensor travel amount calculated by the sensor travel amount calculation unit 11. For example, the reliability of the sensor travel amount can be calculated based on the number of same objects among a plurality of images acquired as the sensor information by the single-lens camera at the predetermined frame rate, a result of association of feature points obtained from the respective images, the accuracy of the distance to an object captured in each image, and the like. The reliability calculation unit 12 outputs, to the error cause determination unit 16, the calculated reliability and the sensor travel amount input from the sensor travel amount calculation unit 11.

The sensor information change point detection unit 13 detects, as the sensor information change point, a situation in which change of the sensor information is large based on the sensor information sequentially acquired from the external sensor 20. For example, the luminance value of each pixel among the plurality of images acquired as the sensor information by the single-lens camera at the predetermined frame rate is compared, and when the luminance value has large change as a whole image, it is determined that an illumination condition has changed, and the change is detected as the sensor information change point. When having detected such a sensor information change point, the sensor information change point detection unit 13 outputs a result of the detection to the sensor travel amount calculation unit 11 and the error cause determination unit 16. Note that the contents of processing performed by the sensor information change point detection unit 13 will be described in detail later.

The vehicle travel amount calculation unit 14 calculates the travel amount of the own-vehicle by dead reckoning based on the vehicle information 30 input to the travel amount estimation apparatus 10. Hereinafter, the travel amount of the own-vehicle based on the vehicle information 30 calculated by the vehicle travel amount calculation unit 14 is referred to as a "vehicle travel amount". The vehicle travel amount calculation unit 14 calculates the vehicle travel amount by using a plurality of predetermined parameters in accordance with the vehicle information 30 and outputs an obtained calculation result of the vehicle travel amount to the vehicle travel amount correction unit 17.

The vehicle information change point detection unit 15 detects, as a vehicle information change point, a situation in which error is likely to occur to the vehicle travel amount based on the vehicle information 30 input to the travel amount estimation apparatus 10. For example, a case corresponding to a situation in which the own-vehicle is turning or a situation in which the own-vehicle has traveled over a level difference is determined based on information of the own-vehicle included in the vehicle information 30, such as the steering wheel angle and the acceleration amount, and the situation is detected as a vehicle information change point. When having detected such a vehicle information change point, the vehicle information change point detection unit 15 outputs a result of the detection to the error cause determination unit 16. Note that the contents of processing performed by the vehicle information change point detection unit 15 will be described in detail later.

The error cause determination unit 16 determines an error cause of the vehicle travel amount calculated by dead reckoning by the vehicle travel amount calculation unit 14, based on the information input from the reliability calculation unit 12, the sensor information change point detection unit 13, and the vehicle information change point detection unit 15. For example, when a vehicle information change point is detected by the vehicle information change point detection unit 15, the error cause of the vehicle travel amount is determined to be "turn" or "level difference" based on a result of the detection. Then, when an error cause is determined, information of the sensor travel amount in accordance with the error cause is output to the vehicle travel amount correction unit 17 based on the sensor travel amount calculated by the sensor travel amount calculation unit 11 and the reliability of the sensor travel amount calculated by the reliability calculation unit 12. Specifically, for example, among the plurality of parameters used when the vehicle travel amount calculation unit 14 performs the calculation of the vehicle travel amount, a correction target parameter in accordance with the error cause and information of the sensor travel amount corresponding to the parameter are output to the vehicle travel amount correction unit 17. Note that the contents of processing performed by the error cause determination unit 16 will be described in detail later.

The vehicle travel amount correction unit 17 estimates the travel amount of the own-vehicle by correcting the vehicle travel amount input from the vehicle travel amount calculation unit 14 based on the information of the sensor travel amount in accordance with the error cause, which is input from the error cause determination unit 16. For example, when it is determined by the error cause determination unit 16 that the error cause of the vehicle travel amount is "turn", the sensor travel amount is used to correct the rotation amount of the own-vehicle, which is calculated from the vehicle information 30. For example, when it is determined by the error cause determination unit 16 that the error cause of the vehicle travel amount is "level difference", the sensor travel amount is used to correct the travel amount (translation amount) of the own-vehicle, which is calculated from the vehicle information 30. Then, the estimated travel amount of the own-vehicle is output to the outside of the travel amount estimation apparatus 10, for example, to the automatic parking system 40.

The automatic parking system 40 recognizes parking candidate positions based on images captured by the single-lens camera and the vehicle information 30, which are input as the sensor information from the external sensor 20, and sets any of the parking candidate positions as a parking position. Then, a parking path from the current position of the own-vehicle to the set parking position is generated, and the own-vehicle is controlled to autonomously travel to the parking position in accordance with the parking path. In this case, the automatic parking system 40 performs the controls of the own-vehicle by using an estimation result of the travel amount of the own-vehicle, which is output from the travel amount estimation apparatus 10.

Figure 2:
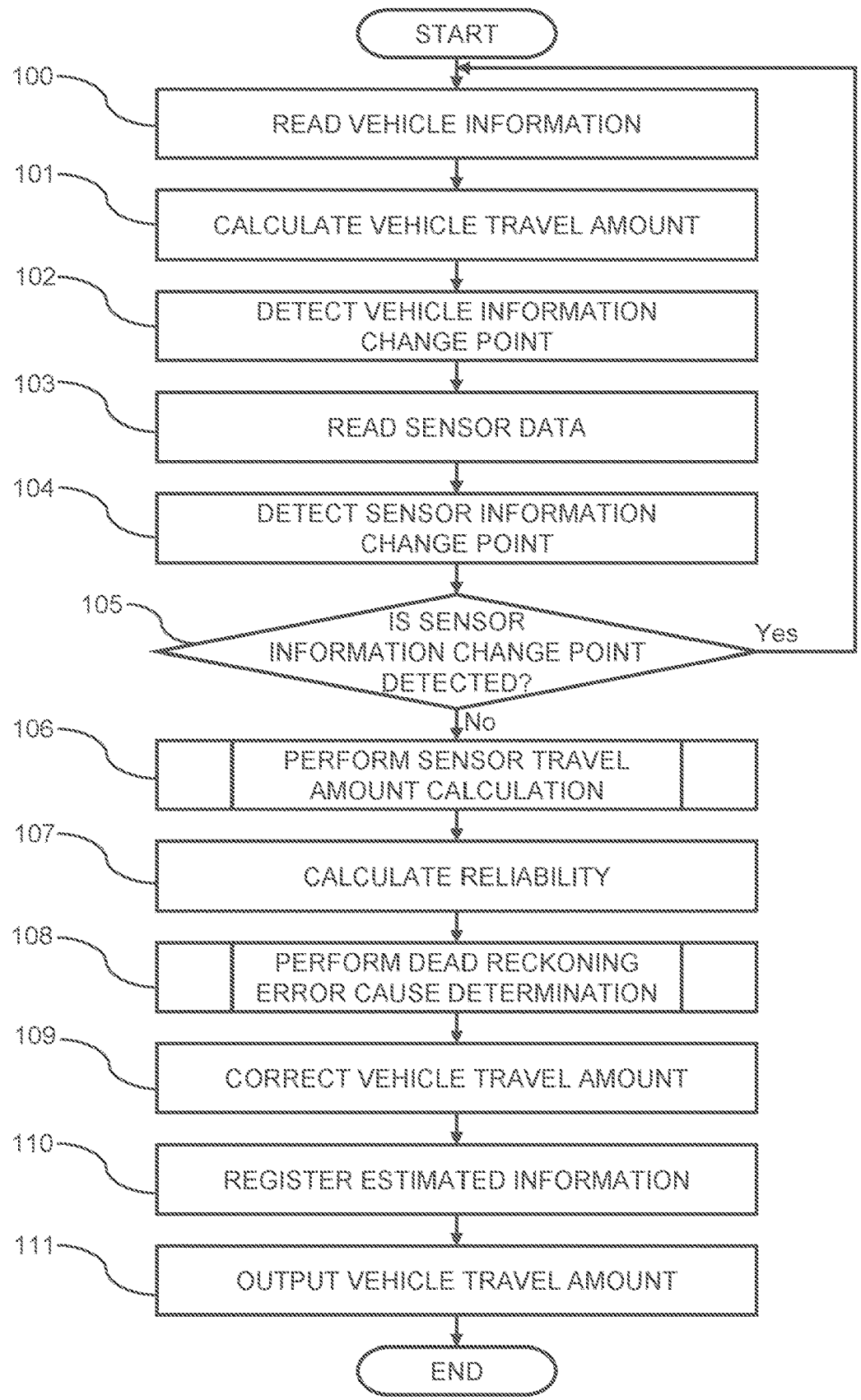
FIG. 2 is a flowchart illustrating the entire processing performed by the travel amount estimation apparatus according to a first embodiment of the present invention.
Figure 3:
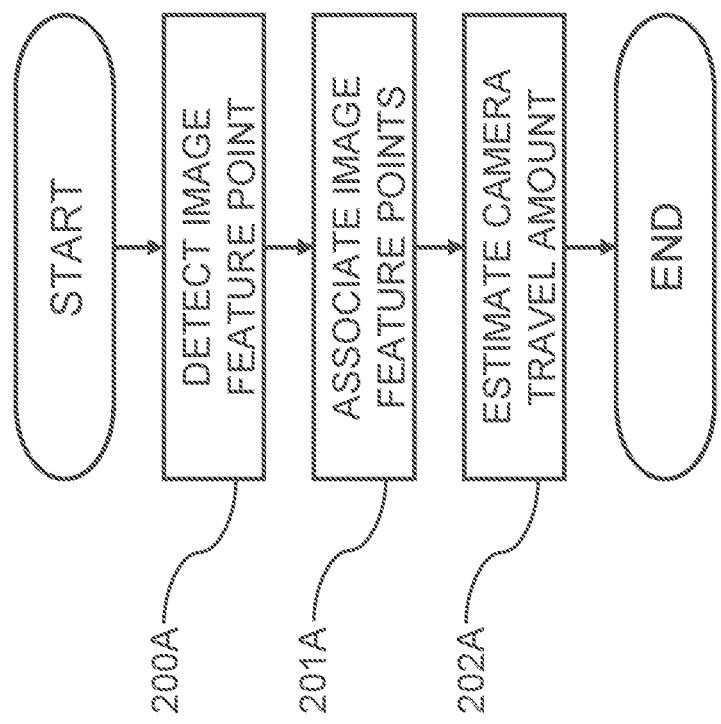
FIG. 3 is a flowchart of sensor travel amount calculation processing according to the first embodiment of the present invention.
Figure 4:
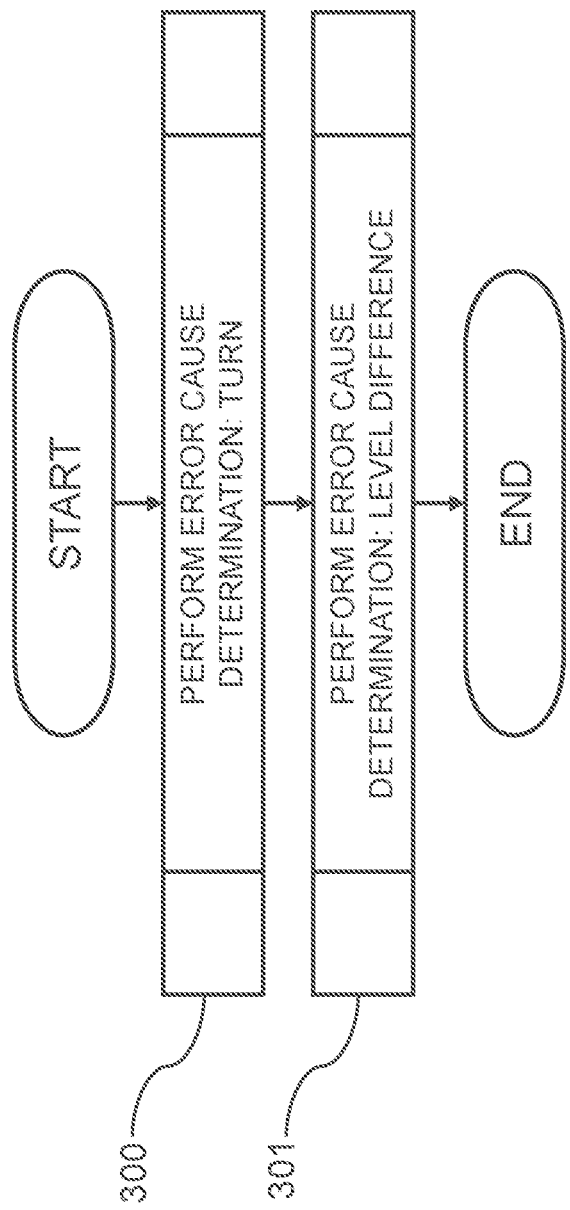
FIG. 4 is a flowchart of error cause determination processing.
Figure 5:
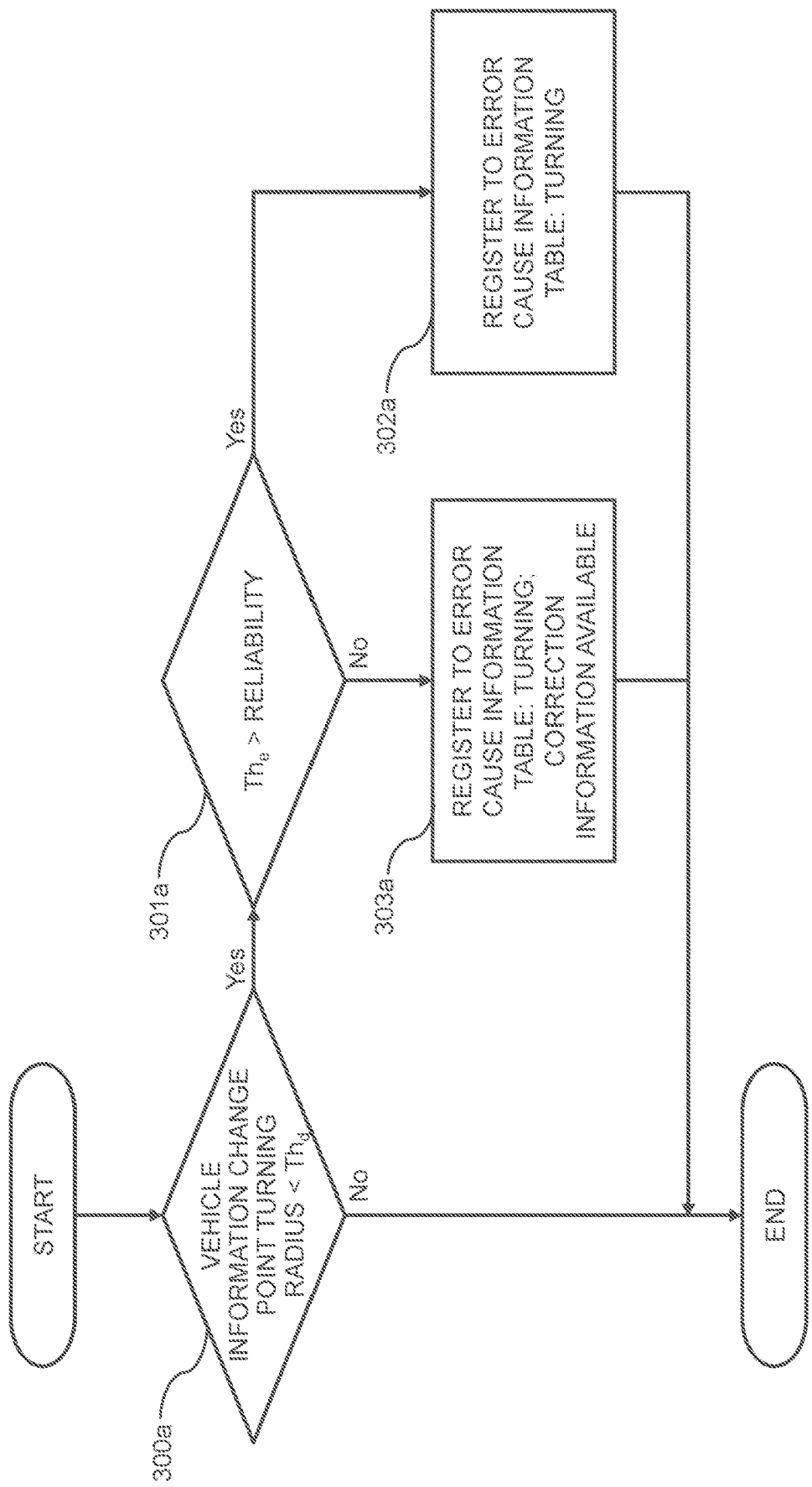
FIG. 5 is a flowchart of turn determination processing.
Figure 6:
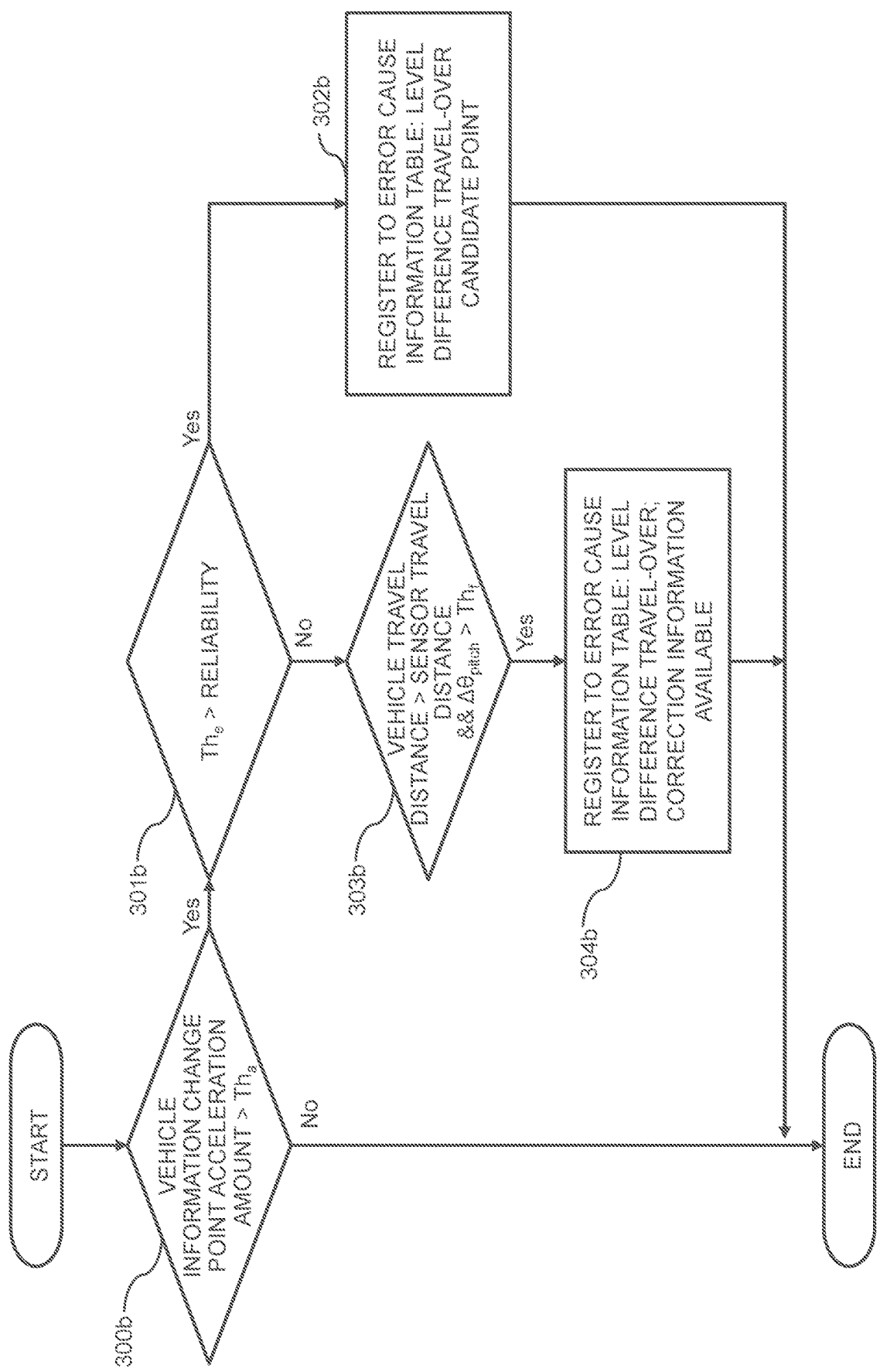
FIG. 6 is a flowchart of level difference determination processing.

Subsequently, processing performed by the travel amount estimation apparatus 10 of the present embodiment will be described below with reference to flowcharts in FIGS. 2 to 6. FIG. 2 is a flowchart illustrating the entire processing performed by the travel amount estimation apparatus 10 according to a first embodiment of the present invention. FIG. 3 is a flowchart of sensor travel amount calculation processing in the processing in FIG. 2. FIG. 4 is a flowchart of error cause determination processing in the processing in FIG. 2. FIG. 5 is a flowchart of turn determination processing performed by the travel amount estimation apparatus 10 in the error cause determination processing in FIG. 4. FIG. 6 is a flowchart of level difference determination processing performed by the travel amount estimation apparatus 10 in the error cause determination processing in FIG. 4.

Figure 12:
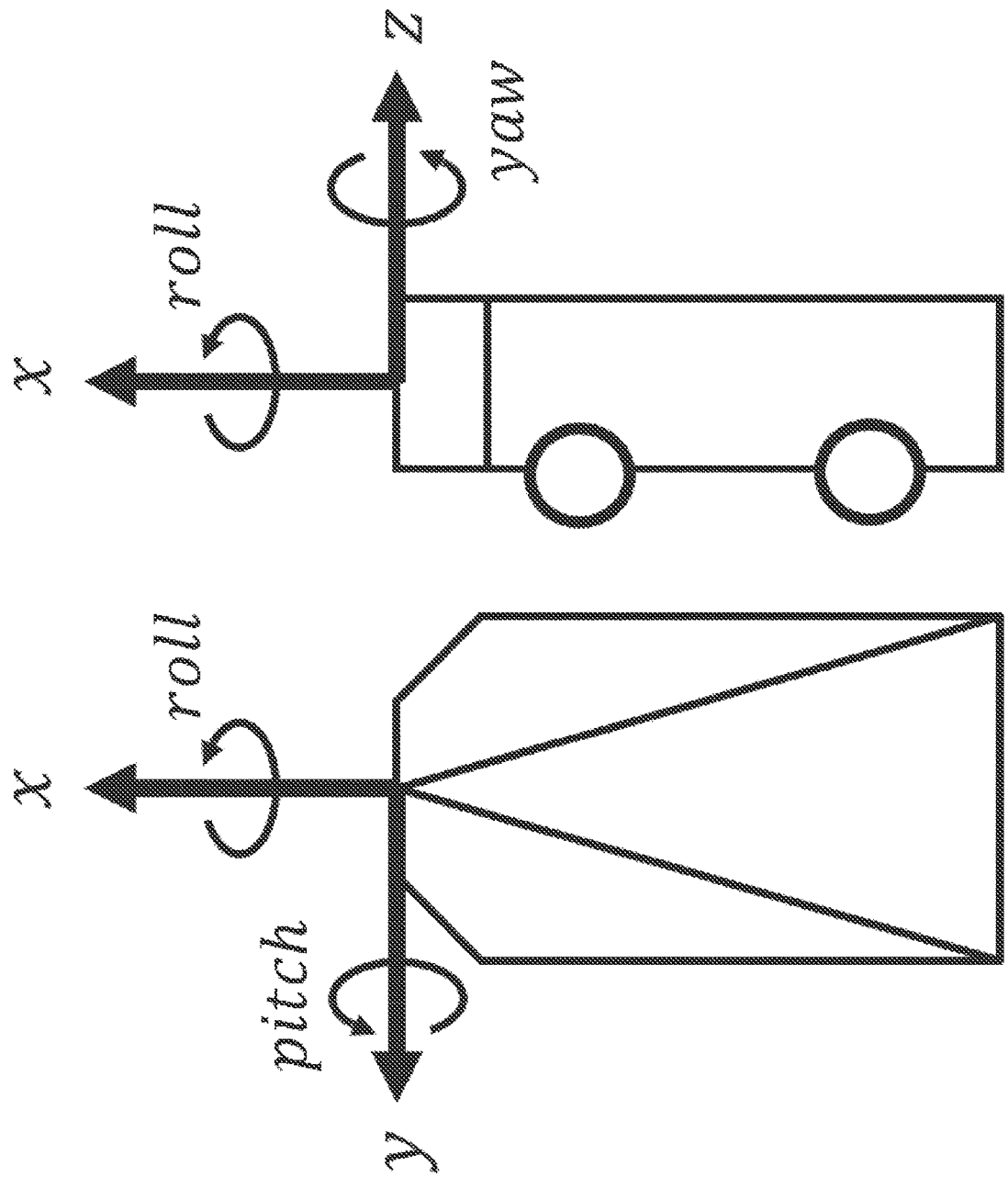
FIG. 12 is a diagram illustrating a vehicle coordinate system.
Figure 13:
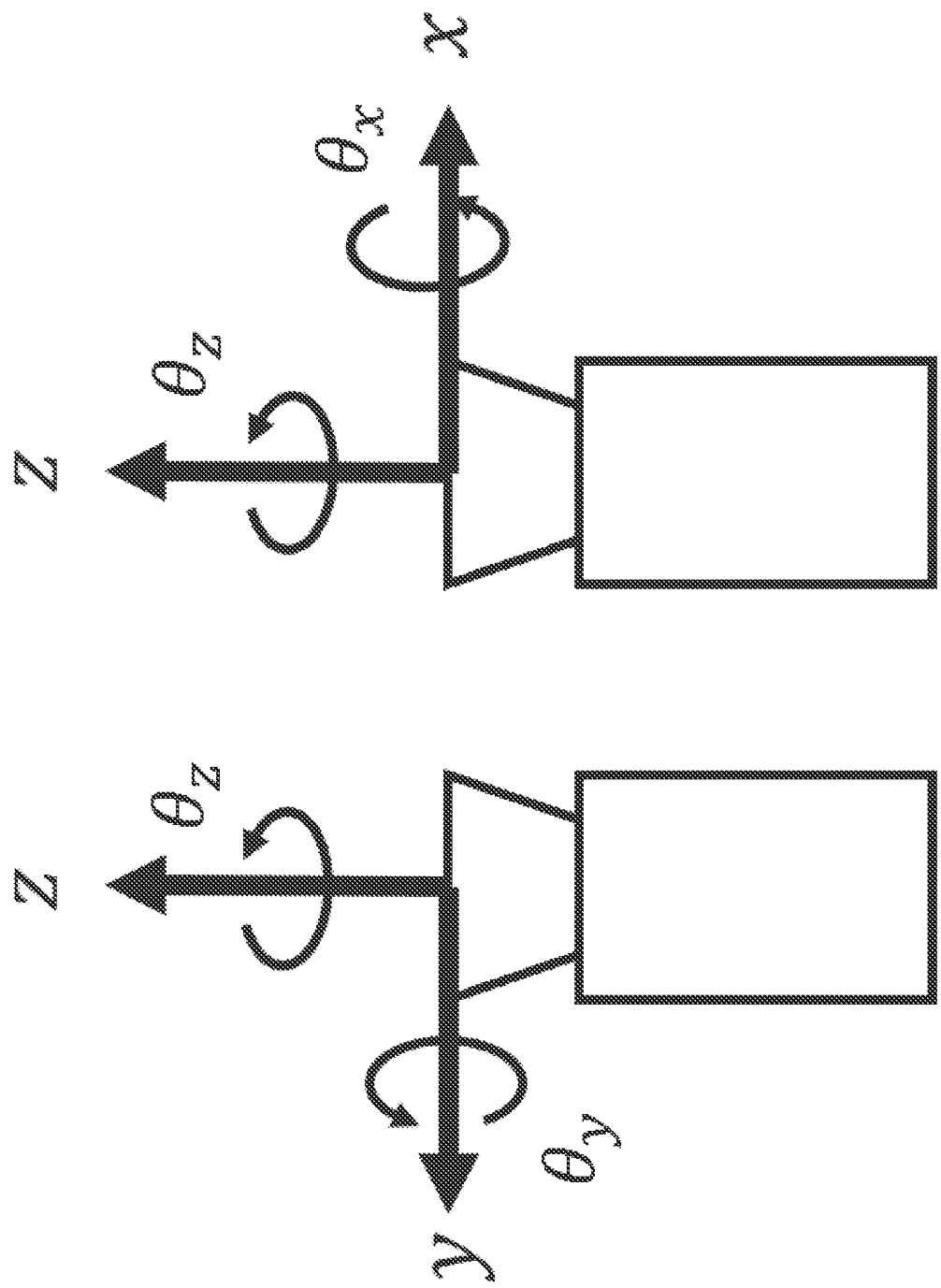
FIG. 13 is a diagram illustrating a camera coordinate system.

Before description of FIGS. 2 to 6, coordinate systems used in processing performed by the travel amount estimation apparatus 10 will be described below. FIG. 12 is a diagram illustrating a vehicle coordinate system used by the travel amount estimation apparatus 10 to indicate the position and posture of the own-vehicle, and FIG. 13 is a diagram illustrating a camera coordinate system used by the travel amount estimation apparatus 10 to indicate the position and posture of the single-lens camera mounted as the external sensor 20 on the own-vehicle.

In the vehicle coordinate system illustrated in FIG. 12, the front-back, right-left, and up-down directions with respect to the orientation of the own-vehicle are defined as an x axis, a y axis, and a z axis, respectively. The x axis is positive in the traveling direction (front face direction) of the own-vehicle, the y axis is positive in the leftward direction with respect to the traveling direction of the own-vehicle, and the z axis is positive in the directly upward direction of the own-vehicle. Rotation (roll, pitch, yaw) about the axes is positive in the clockwise direction. In the present embodiment, the rotation and translation amounts of the own-vehicle are expressed as in Expression (1) below by using the vehicle coordinate system in FIG. 12 and are used to indicate the position and posture of the own-vehicle. In Expression (1), $\theta_{roll}$ represents the rotation amount about the x axis, $\theta_{pitch}$ represents the rotation amount about the y axis, $\theta_{yaw}$ represents the rotation amount about the z axis, $x_{car}$ represents the translation amount in the x-axis direction, $y_{car}$ represents the translation amount in the y-axis direction, and $z_{car}$ represents the translation amount in the z-axis direction. Note that the rotation amount corresponds to the posture of the own-vehicle, and the translation amount corresponds to the position of the own-vehicle.

$$\text{Rotation amount of own-vehicle} = (\theta_{roll}, \theta_{pitch}, \theta_{yaw})$$

$$\text{Translation amount of own-vehicle} = (x_{car}, y_{car}, z_{car}) \quad (1)$$

In the camera coordinate system illustrated in FIG. 13, the right-left and up-down directions when the single-lens camera as the external sensor 20 is viewed in the directly upward direction are defined as an x axis and a y axis, respectively, and the optical axis direction of the single-lens camera is defined as a z axis. The x axis is positive in the rightward direction of the single-lens camera, the y axis is positive in the directly downward direction of the single-lens camera, and the z axis is positive in the image capturing direction of the single-lens camera. Rotation about each axis is positive in the clockwise direction. In the present embodiment, the rotation and translation amounts of the single-lens camera are expressed as in Expression (2) below by using the camera coordinate system in FIG. 13 and are used to indicate the position and posture of the single-lens camera. In Expression (2), $\theta_x$ represents the rotation amount about the x axis, $\theta_y$ represents the rotation amount about the y axis, $\theta_z$ represents the rotation amount about the z axis, $x_{camera}$ represents the translation amount in the x-axis direction, $y_{camera}$ represents the translation amount in the y-axis direction, and $z_{camera}$ represents the translation amount in the z-axis direction. Note that the rotation amount corresponds to the posture of the single-lens camera, and the translation amount corresponds to the position of the single-lens camera.

Rotation amount of single-lens camera=$(\theta_x, \theta_y, \theta_z)$

Translation amount of single-lens camera=
$(x_{camera}, y_{camera}, z_{camera})$ (2)

In the following description, the rotation and translation amounts of the own-vehicle in the vehicle coordinate system, which are expressed in Expression (1) described above, are calculated for each predetermined processing period by the vehicle travel amount calculation unit 14 in the travel amount estimation apparatus 10. The rotation and translation amounts of the single-lens camera in the camera coordinate system, which are expressed in Expression (2) described above, are calculated for each predetermined processing period by the sensor travel amount calculation unit 11 in the travel amount estimation apparatus 10.

Subsequently, the flowchart in FIG. 2 will be described below. The entire processing illustrated in the flowchart in FIG. 2 is started at the travel amount estimation apparatus 10 when a user activates the automatic parking system 40, determines a parking position, and instructs the own-vehicle to autonomously travel to the determined parking position. Note that, in the following description, a wide-angle single-lens camera attached to the own-vehicle is used as the external sensor 20.

At step 100, the travel amount estimation apparatus 10 acquires, from the own-vehicle, the vehicle information 30 related to traveling of the own-vehicle. For example, information such as the steering wheel angle, the tire rotation amount, and the acceleration amount of the own-vehicle is acquired as the vehicle information 30 in the period of 33 ms.

At step 101, the vehicle travel amount calculation unit 14 calculates the vehicle travel amount indicating the current travel amount of the own-vehicle based on the vehicle information 30 acquired at step 100. For example, how the own-vehicle has traveled is calculated from the steering wheel angle and the tire rotation amount acquired as the vehicle information 30. Alternatively, another calculation method may be employed. Examples of such methods include a method in which the rotation amount of each tire is individually acquired as the vehicle information 30 and the vehicle travel amount is calculated from difference among the rotation amounts, and a method in which angular acceleration about each axis and acceleration are acquired as the vehicle information 30 from an inertia navigation apparatus mounted on the own-vehicle and multiplied. Hereinafter, the method of calculating the vehicle travel amount from the steering wheel angle and the rotation, amount of each tire will be exemplarily described.

When the vehicle travel amount is calculated from the steering wheel angle and the rotation amount of each tire, motion of the own-vehicle needs to be modeled. For example, a model in which motion of the own-vehicle is approximated to a straight line or a curved line is applicable, but the vehicle travel amount calculation unit 14 of the present embodiment calculates the vehicle travel amount based on an assumption of a vehicle motion model expressed in Expressions (3) to (6) below. In the expressions, $R_t$ represents the turning radius of the own-vehicle at acquisition time t of the current vehicle information 30 and is calculated from the steering wheel angle of the own-vehicle, which is included in the vehicle information 30. In addition, $\rho_t$ represents the curvature of turning motion of the own-vehicle at time t, $\theta_{yaw\_t}$ represents the orientation of the own-vehicle about the z axis at time t, and $\Delta S_t$ represents the travel distance of the own-vehicle between acquisition time t−1 of the previous vehicle information 30 and time t. In addition, $x_{car\_t}$ and $y_{car\_t}$ represent the translation amount in the x-axis and y-axis directions, respectively, at time t, in other words, represents the position of the own-vehicle, and $x_{car\_t-1}$ and $y_{car\_t-1}$ represent the translation amount in the x-axis and y-axis directions, respectively, at time t−1, in other words, represents the position of the own-vehicle.

$\rho_t = 1/R_t$ (3)

$\Delta \theta_{yaw\_t} = \Delta S_t \cdot \rho_t$ (4)

$(x_{car\_t}, y_{car\_t}) = (x_{car\_t-1}, y_{car\_t-1}) + \Delta S_t (\cos \theta_{yaw\_t-1}, \sin \theta_{yaw\_t-1})$ (5)

$\theta_{yaw\_t} = \theta_{yaw\_t-1} + \Delta \theta_{yaw\_t}$ (6)

At step 102, the vehicle information change point detection unit 15 detects, as a vehicle information change point, a situation in which error is likely to occur the vehicle travel amount based on the vehicle information 30 acquired at step 100. For example, the steering wheel angle and acceleration amount of the own-vehicle are acquired as the vehicle information 30 in the period of 33 ms, and a vehicle information change point is detected as the error cause of the vehicle travel amount when it is determined based the vehicle information 30 that the own-vehicle is turning or the own-vehicle has potentially traveled over a small level difference that can be traveled over by the own-vehicle.

Note that a condition of detection of a vehicle information change point is different depending on an application target system. This is because an error cause needed to be considered is different depending on a factor such as the vehicle speed. In the present embodiment, the travel amount estimation apparatus 10 used in combination with the automatic parking system 40 is assumed. It is assumed that the automatic parking system 40 operates when the speed of the own-vehicle is 10 km/h or lower approximately. Thus, in the present embodiment, turn and level difference travel-over of the vehicle are considered as error causes of the vehicle travel amount. For example, it is determined that the own-vehicle is turning when the turning radius calculated based on the vehicle information 30 is equal to or smaller than a threshold value (for example, 20 m) set in advance, and it is determined that the own-vehicle has traveled over a level difference when the acceleration amount indicated by the vehicle information 30 is equal to or larger than a threshold value set in advance. Note that since an error cause needed to be considered is different depending on an application target system and accordingly the determination threshold values are different, the condition of detection of a vehicle information change point is not limited to the contents of the above description.

At step 103, the travel amount estimation apparatus 10 acquires the sensor information related to the surrounding environment of the own-vehicle from the external sensor 20. In the present embodiment, since the single-lens camera is used as the external sensor 20 as described above, images captured by the single-lens camera are acquired as the sensor information. For example, images captured by the single-lens camera in the period of 33 ms at an image size of width 640×height 400 pixels are acquired as the sensor information.

At step 104, the sensor information change point detection unit 13 detects, as a sensor information change point, a situation in which change of the sensor information is large based on the sensor information acquired at step 103. For example, in a case in which images acquired as the sensor information have abruptly changed due to change of the illumination condition at image capturing, accurate estimation of the sensor travel amount is impossible, and thus the case is detected as a sensor information change point in advance. In this case, abrupt change of the illumination condition can be detected based on luminance change through images. For example, the average of the luminance value of each pixel is calculated and compared with that of the previous image. As a result, when difference in the average of the luminance value from the previous image is equal to or larger than a predetermined threshold value, it is determined that the illumination condition has abruptly changed, and accordingly, a sensor information change point can be detected. In the determination, an image stored in the previous processing period at step 110 to be described later may be used as the previous image. Note that when step 110 has not executed once, a sensor information change point may be detected based on the average of the luminance value of each pixel as a whole image. For example, when the luminance value is expressed in 0 to 255 and the average of the luminance value is equal to or smaller than 50, it is determined that the corresponding image is generally too dark to be used for estimation of the sensor travel amount, and a sensor information change point is detected. When the average of the luminance value is equal to or larger than 200, it is determined that the corresponding image is generally too bright to be used for estimation of the sensor travel amount because overexposure has potentially occurred, and a sensor information change point is detected. Alternatively, a sensor information change point may be detected on any other optional condition.

At step 105, whether to truncate the subsequent processing is determined based on a result of the detection of a sensor information change point at step 104. When a sensor information change point is detected at step 104, calculation of the sensor travel amount does not obtain a correct calculation result and the vehicle travel amount cannot be appropriately corrected, and thus processing at step 106 and later is truncated, and the process is returned to step 100. In this case, calculation of the sensor travel amount by the sensor travel amount calculation unit 11 is not performed. When no sensor information change point is detected at step 104, the process proceeds to the next step 106 to perform calculation of the sensor travel amount.

At step 106, the sensor travel amount calculation unit 11 calculates the sensor travel amount indicating the current travel amount of the own-vehicle based on the sensor information acquired at step 103. In this process, calculation of the sensor travel amount is performed in accordance with, for example, the flowchart illustrated in FIG. 3.

In FIG. 3, it is assumed that the travel amount of the own-vehicle is calculated by extracting feature points from images acquired as the sensor information and calculating the travel amount of the camera from pairs of feature points thus extracted. First, at step 200A, the sensor travel amount calculation unit 11 extracts image feature points from the images read at step 103 in FIG. 2. In the present embodiment, the image feature points are extracted by, for example, a well-known processing method called Oriented FAST and Rotated BRIEF (ORB). Note that another processing method, for example, a corner point extraction method such as Harris corner detection, Tomasi, or features from accelerated segment test (FAST), which has no feature amount description, or a feature point extraction method such as SURF or SIFT may be used, and thus the processing method is not limited.

At step 201A, the sensor travel amount calculation unit 11 associates an image feature point extracted from the latest image at step 200A with an image feature point extracted from an image acquired in the previous processing period. In this process, image feature points corresponding to capturing of the same part of the same object among image feature points extracted from captured images acquired in a temporally sequential manner are associated with each other. This association is performed through, for example, comparison between the feature amounts of the image feature points or comparison between the values of pixels around the image feature points. For example, in a case of ORB used for image feature point extraction in the present embodiment, the feature amounts of image feature points can be compared by calculating exclusive OR of the feature amounts described in binary, and as difference therebetween is smaller, the image feature points are more likely to be feature points corresponding to capturing of the same part of the same object. In a case of corner points detected by a method, such as the Harris corner detection, which has no feature amount, image feature points can be associated with each other through comparison of surrounding pixels of each image feature point, such as the sum of squared difference (SSD) or the Kanade-Lucas-Tomasi feature tracker (KLT) method.

In the association of image feature points at step 201A, an association result of wrongly associated image feature points may be removed. For example, whether an association result of image feature points is correct can be checked by using a well-known method called cross-check. In this method, although detailed description is omitted, when images A and B are two captured images in which image feature points are associated with each other, a result of association from the image A to the image B and a result of association from the image B to the image A are compared with each other, and when the same result is obtained, the result is employed as an association result of image feature points.

At step 202A, the sensor travel amount calculation unit 11 estimates the travel amount of the camera based on the pairs of image feature points determined to correspond to each other at step 201A. Typically, when the travel amount of the camera is estimated based on images, the travel amount is estimated with, as a constraint, the geometric relation between images captured different places at different times. The geometric relation is a constraint that when a pair of image feature points corresponding to each other exist in two images captured at different places, the image feature point in one of the images always exists on a straight line (epipolar line) obtained an optical line connecting the image feature point in the other image and the origin of the camera is projected onto the one image.

Figure 7:
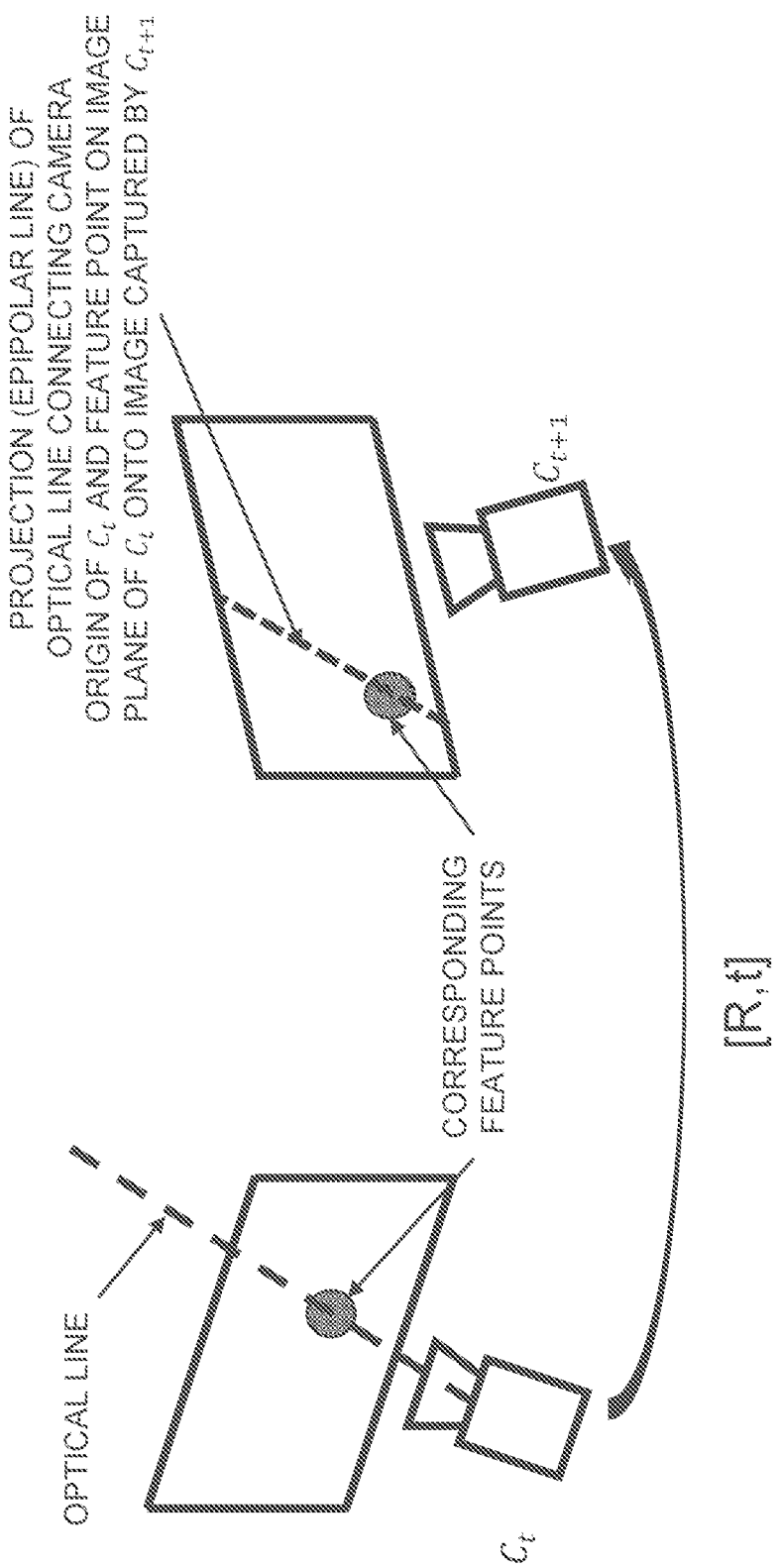
FIG. 7 is a diagram illustrating an exemplary geometric relation when the travel amount of a camera is estimated from images.

FIG. 7 is a diagram illustrating an exemplary geometric relation when the travel amount of the camera is estimated from images. Consider a case in which, in FIG. 7, feature points corresponding to each other are detected in an image captured at a camera position $C_t$ at time t and an image captured at a camera position $C_{t+1}$ at time t+1. In this case, as illustrated in FIG. 7, an epipolar line is defined as projection of, onto the image captured at the camera position $C_{t+1}$, an optical line connecting the origin of the camera at the camera position $C_t$ and the feature point on the plane of the image captured at the camera position $C_t$. The feature point in the captured image at the camera position $C_{t+1}$ exists on the epipolar line.

At step 202A, a travel amount with which all pairs of image feature points associated with each other satisfy such a constraint is estimated as the travel amount of the camera. After the travel amount of the camera is estimated at step 202A, the sensor travel amount calculation unit 11 outputs this estimation result as a calculation result of the sensor travel amount, and ends the sensor travel amount calculation processing illustrated in the flowchart in FIG. 3.

After the sensor travel amount calculation processing by the sensor travel amount calculation unit 11 is ended, the travel amount estimation apparatus 10 proceeds from step 106 to step 107 in FIG. 2.

When the travel amount of the camera is estimated at step 202A in FIG. 3 by using the geometric relation illustrated in FIG. 7 as a constraint, methods of the estimation are a method using a least-square method, and a method using repetition calculation such as a gradient descent method. With the method using the least-square method, an obtained estimation result of the travel amount is unstable in some cases depending on an initial value. The method using repetition calculation has stable estimation accuracy but has a long calculation time period. In the present embodiment, the travel amount of the camera, which is calculated from the vehicle information 30, can be used as an initial value for the least-square method, thereby stabilizing the estimation accuracy and shortening the processing time period. Note that another estimation method, for example, a method such as bundle adjustment in which the travel amount can be more highly accurately estimated from the relation among a plurality of images may be used, and thus the method of estimating the travel amount of the camera is not limited.

At step 107, the reliability calculation unit 12 calculates the reliability of the sensor travel amount calculated by the sensor travel amount calculation unit 11 at step 106. The calculated reliability is used to prevent the vehicle travel amount from being wrongly corrected by using the sensor travel amount including large error and calculated when the accuracy of detection of the sensor information by the external sensor 20 is low. For example, the reliability calculation unit 12 calculates the reliability to be low in a situation difficult for the external sensor 20, and calculates the reliability to be high in the other situation. When a camera is used as the external sensor 20, the sensor travel amount is likely to have large error in a situation in which repetitive patterns appear in an image, for example, a situation in which there are a large number of objects, such as leaves, having shapes similar to one another. When a distance sensor such as a LiDAR or a radar is used as the external sensor 20, the sensor travel amount is likely to have large error in a situation in which similar environments with small undulation continue in the circumference of the own-vehicle as in a tunnel. Thus, reliability calculation is performed by the reliability calculation unit 12 so that the reliability in these situations is lower than that in other situations.

In the present embodiment, the single-lens camera is used as the external sensor 20 as described above, and for example, three indexes described below can be used to determine the reliability of the sensor travel amount calculated based on the external sensor 20.

The first index is the number of image feature points associated between images. Specifically, as the number of image feature points associated at step 201A in FIG. 3 is larger, the reliability of the sensor travel amount can be determined to be higher. This is because it is known that error in association of image feature points typically has distribution close to Laplace distribution having an average at zero, and error in the sensor information can be smoothed to obtain an accurate result when the travel amount is estimated by the least-square method using a result of association of a large number of image feature points.

The second index is the average value of the distance between each image feature point and the epipolar line, which can be obtained at estimation of the travel amount of the camera. Specifically, as described above, estimation of the travel amount of the camera at step 202A in FIG. 3 has a constraint that an image feature point in an image corresponding to an image feature point in another image always exists on the epipolar line in the image. Thus, when correctly associated image feature points are used, the distance between each image feature point and the epipolar line is extremely short. Thus, as the average value of the distance between each image feature point and the epipolar line is smaller, the reliability of the sensor travel amount can be determined to be higher.

The third index is the existence of inconsistency between a calculation result of the sensor travel amount and the vehicle information. Specifically, when a large number of errors exist in image feature points, the sensor travel amount including large error is estimated, and accordingly, an estimation result that the own-vehicle is turning in a direction opposite to the turning direction of the steering wheel, which is indicated by the vehicle information is obtained in some cases. Thus, when such inconsistency exists, the reliability of the sensor travel amount can be determined to be low.

In the present embodiment, a predetermined threshold value is set for each above-described index so that the reliability can be calculated by determining whether the index exceeds the threshold value. For example, the threshold value of the first index is set such that the number of pairs of associated image feature points is equal to or larger than 50, and the threshold value of the second index is set such that the average value of the distance between each image feature point and the epipolar line is equal to or smaller than 0.5. In the present embodiment, the reliability is set to be one when all above-described conditions are satisfied, in other words, when the number of pairs of associated image feature points is equal to or larger than 50, the average value of the distance between each image feature point and the epipolar line is equal to or smaller than 0.5, and no inconsistency exists between the calculation result of the sensor travel amount and the vehicle information, and the reliability is set to be zero when any condition is not satisfied. Note that the above-described threshold values depend on feature point extraction and association methods, image sizes, and the like and thus are not restrictive, and it is preferable to set values suitable for a system.

At step 108, the error cause determination unit 16 determines an error cause due to dead reckoning, in other words, an error cause for the vehicle travel amount calculated by the vehicle travel amount calculation unit 14 at step 101. The error cause determination is performed in accordance with, for example, the flowchart illustrated in FIG. 4.

In the present embodiment, for example, two error causes below are considered as error causes due to dead reckoning. The two error causes are turn and level difference travel-over of the own-vehicle. At step 300, the error cause determination unit 16 performs determination on turn of the own-vehicle as the first error cause. Processing of determination on turn of the own-vehicle is performed in accordance with, for example, the flowchart illustrated in FIG. 5.

At step 300a, the error cause determination unit 16 checks whether the vehicle information change point detection unit 15 has detected, as a vehicle information change point, that the own-vehicle is turning at step 102 in FIG. 2. For example, when $Th_d$ represents the threshold value of the turning radius used in the determination at step 102 and the turning radius of the own-vehicle is smaller than the threshold value $Th_d$, it is determined that the own-vehicle is turning at step 102, and this situation is detected as a vehicle information change point. In this case, the process proceeds to step 301a. When the turning radius of the own-vehicle is equal to or larger than the threshold value $Th_d$, it is determined that the own-vehicle is not turning at step 102, and this situation is not detected as a vehicle information change point. In this case, it is determined that the own-vehicle is not turning but traveling straight, and the determination processing in FIG. 5 is ended. Note that the determination at step 300a may be performed based on information of the steering wheel angle included in the vehicle information 30 without checking a result of the processing at step 102.

At step 301a, the error cause determination unit 16 determines whether the reliability of the sensor travel amount calculated by the reliability calculation unit 12 at step 107 in FIG. 2 is lower than a predetermined threshold value $Th_e$ set in advance. The threshold value $Th_e$ is set to be, for example, 0.5. As a result, the process proceeds to step 302a when the reliability is lower than the threshold value $Th_e$, or the process proceeds to step 303a when the reliability is equal to or higher than the threshold value $Th_e$.

At step 302a, the error cause determination unit 16 registers, to an error cause information table, information that the own-vehicle is turning. The error cause information table is a table for recording the error cause of the vehicle travel amount when a vehicle information change point is detected and whether correction of the vehicle travel amount by using the sensor travel amount is possible, and is stored in a storage medium (not illustrated), such as a RAM or a hard disk, which is included in the travel amount estimation apparatus 10. In this process, "turning", which is information indicating that the own-vehicle is turning, is registered as the error cause of the vehicle travel amount to the error cause information table, and information indicating that correction of the vehicle travel amount by using the sensor travel amount is impossible is registered to the error cause information table. Specifically, when it is determined that the reliability of the sensor travel amount is lower than the threshold value $Th_e$ at step 301a, turn of the own-vehicle, which is the error cause of the vehicle travel amount, is performed but the reliability of the sensor travel amount is low. Thus, information to be registered to the error cause information table is determined so that correction of the vehicle travel amount by using the sensor travel amount is prohibited.

At step 303a, the error cause determination unit 16 registers, to the error cause information table, information that the own-vehicle is turning, and registers, to the error cause information table, information that correction information usable for correction of the vehicle travel amount is available. In this process, "turning", which is information indicating that the own-vehicle is turning, is registered as the error cause of the vehicle travel amount to the error cause information table, and information indicating that correction of the vehicle travel amount by using the sensor travel amount is possible is registered to the error cause information table. Specifically, when it is determined that the reliability of the sensor travel amount is equal to or higher than the threshold value $Th_e$ at step 301a, turn of the own-vehicle, which is the error cause of the vehicle travel amount, is performed and the reliability of the sensor travel amount is sufficiently high. Thus, information to be registered to the error cause information table is determined so that correction of the vehicle travel amount by using the sensor travel amount is performed.

When registration to the error cause information table is performed at step 302a or 303a, the error cause determination unit 16 ends the processing of determination on turn of the own-vehicle, which is illustrated in FIG. 5, and proceeds to step 301 in FIG. 4.

At step 301, the error cause determination unit 16 performs determination on level difference travel-over of the own-vehicle as the second error cause. Processing of determination on level difference travel-over of the own-vehicle is performed in accordance with, for example, the flowchart illustrated in FIG. 6.

At step 300b, the error cause determination unit 16 checks whether the vehicle information change point detection unit 15 has detected, as a vehicle information change point, a situation that the own-vehicle has traveled over a level difference at step 102 in FIG. 2. For example, when $Th_a$ represents the threshold value of the acceleration amount used in the determination at step 102 and the acceleration amount of the own-vehicle is larger than the threshold value $Th_a$, it is determined that the own-vehicle has traveled over a level difference at step 102, and this situation is detected as a vehicle information change point. In this case, the process proceeds to step 301b. When the acceleration amount of the own-vehicle is smaller than the threshold value $Th_a$, it is determined that the own-vehicle has not traveled over a level difference at step 102, and this situation is not detected as a vehicle information change point. In this case, it is determined that the own-vehicle has not traveled over a level difference but has traveled on a flat surface, and the determination processing in FIG. 6 is ended. Note that the determination at step 300b may be performed based on information of the acceleration amount included in the vehicle information 30 without checking a result of the processing at step 102.

At step 301b, the error cause determination unit 16 determines whether the reliability of the sensor travel amount calculated by the reliability calculation unit 12 at step 107 in FIG. 2 is lower than the above-described threshold value $Th_e$. As a result, the process proceeds to step 302b when the reliability is lower than the threshold value $Th_e$, or the process proceeds to step 303b when the reliability is equal to or higher than the threshold value $Th_e$.

At step 302b, the error cause determination unit 16 determines that the own-vehicle has potentially traveled over a level difference performed, and registers this information to the error cause information table. In this process, "level difference travel-over", which is information indicating the own-vehicle has traveled over a level difference is registered as the error cause of the vehicle travel amount to the error cause information table, and information indicating that correction of the vehicle travel amount by using the sensor travel amount is impossible is registered to the error cause information table. Specifically, when it is determined that the reliability of the sensor travel amount is lower than the threshold value $Th_e$ at step 301b, level difference travel-over of the own-vehicle as the error cause of the vehicle travel amount has been potentially performed but the reliability of the sensor travel amount is low. Thus, information to be registered to the error cause information table is determined so that correction of the vehicle travel amount by using the sensor travel amount is prohibited.

At step 303b, the error cause determination unit 16 verifies whether error has occurred to the vehicle travel amount due to level difference travel-over of the own-vehicle. Specifically, for example, a travel distance (vehicle travel distance) of the own-vehicle, which is calculated from the vehicle travel amount is compared with a travel distance (sensor travel distance) of the own-vehicle, which is calculated from the sensor travel amount, and change in the pitch angle of the own-vehicle, in other words, a difference $\Delta\theta_{pitch}$ of the rotation amount $\theta_{pitch}$ about the y axis from the previous processing is compared with a predetermined threshold value $Th_f$. The comparison between the vehicle travel distance and the sensor travel distance is performed because, when the acceleration amount is increased or a tire spins to travel over a level difference, the vehicle travel distance is calculated as a value larger than the actual travel distance, and a difference from the sensor travel distance is generated. Change in the pitch angle is checked because the rotation amount $\theta_{pitch}$ about the y axis corresponding to the pitch angle among the rotation and translation amounts of the own-vehicle, which are expressed in Expression (1) described above, changes most as the own-vehicle travels over a level difference. As a result, when the vehicle travel distance is longer than the sensor travel distance and change in the pitch angle of the own-vehicle is larger than the threshold value $Th_f$, the process proceeds to step 304*b*. When at least one of these conditions is not satisfied, it is determined that the own-vehicle has not traveled over a level difference, and the determination processing in FIG. 6 is ended.

At step 304*b*, the error cause determination unit 16 registers, to the error cause information table, information that the own-vehicle has traveled over a level difference, and registers, to the error cause information table, information that correction information usable for correction of the vehicle travel amount is available. In this process, "level difference travel-over", which is information indicating that the own-vehicle has traveled over a level difference, is registered as the error cause of the vehicle travel amount to the error cause information table, and information indicating that correction of the vehicle travel amount by using the sensor travel amount is possible is registered to the error cause information table. Specifically, when it is determined that the reliability of the sensor travel amount is equal to or higher than the threshold value $Th_e$ at step 301*b* and the conditions at step 303*b* are satisfied, level difference travel-over of the own-vehicle, which is the error cause of the vehicle travel amount, has occurred and the reliability of the sensor travel amount is sufficiently high. Thus, information to be registered to the error cause information table is determined so that correction of the vehicle travel amount by using the sensor travel amount is performed.

When registration to the error cause information table is performed at step 302*b* or 304*b*, the error cause determination unit 16 ends the processing of determination on level difference travel-over of the own-vehicle, which is illustrated in FIG. 6. Then, the error cause information table obtained through the processing at steps 300 and 301 is output as a result of the error cause determination processing illustrated in FIG. 4, and the process proceeds to step 109 in FIG. 2.

FIG. 8 is a diagram illustrating an exemplary error cause information table stored in the travel amount estimation apparatus 10. The error cause information table illustrated in FIG. 8 has the fields of frame number 801, turn 802, level difference 803, and correction information 804. The frame number of an image input as the sensor information is stored as the frame number 801. A flag value corresponding to the above-described "turning" indicating that the own-vehicle is turning is stored as the turn 802. A flag value corresponding to the above-described "level difference travel-over" indicating that the own-vehicle has traveled over a level difference is stored as the level difference 803. A flag value indicating whether correction of the vehicle travel amount by using the sensor travel amount is possible is stored as the correction information 804.

At step 109, the vehicle travel amount correction unit 17 corrects the vehicle travel amount based on the error cause information table output from the error cause determination unit 16 at step 108. In this process, when information indicating that correction of the vehicle travel amount by using the sensor travel amount is possible is registered in the error cause information table, correction of the vehicle travel amount in accordance with an error cause is performed by using the sensor travel amount calculated by the sensor travel amount calculation unit 11 at step 106.

For example, when "turning" is registered in the error cause information table, the rotation amount of the vehicle travel amount is replaced with the rotation amount of the sensor travel amount, thereby correcting the rotation amount of the own-vehicle, which is calculated from the vehicle information 30, by using the sensor travel amount. Then, the translation amount of the vehicle travel amount is recalculated by using the replaced rotation amount. The recalculation of the translation amount can be performed by, for example, calculating a travel distance from the translation amount in each axis direction, which is calculated from the vehicle travel amount, and converting the distance into a vector in the axis direction by using a rotation amount calculated from the sensor travel amount. Not both the rotation and translation amounts are replaced to prevent scale drift, which is a problem at use of a single-lens camera. Specifically, when the translation amount is constantly corrected while the own-vehicle is turning, the translation amount is estimated to be larger or smaller than an actually traveled distance due to the scale drift. Thus, when a single-lens camera is used as the external sensor 20, it is preferable that the translation amount of the vehicle travel amount is not directly corrected from the translation amount of the sensor travel amount.

For example, when "level difference travel-over" is registered in the error cause information table, the translation amount of the vehicle travel amount is recalculated by using the translation amount of the sensor travel amount and the rotation amount of the vehicle travel amount. Accordingly, the travel amount of the own-vehicle, which is calculated from the vehicle information 30, is corrected by using the sensor travel amount. In this case, the actual travel distance as an instantaneous value can be acquired from the translation amount of the sensor travel amount more accurately than error generated in the translation amount of the vehicle travel amount. Thus, the translation amount of the vehicle travel amount can be corrected without influence of the above-described scale drift.

Note that when information indicating that correction of the vehicle travel amount by using the sensor travel amount is possible is not registered in the error cause information table, the vehicle travel amount correction unit 17 does not perform correction of the vehicle travel amount by using the sensor travel amount irrespective of an error cause. This prevents correction of the vehicle travel amount by using the sensor travel amount, the reliability of which is low.

At step 110, the pieces of information obtained through the series of processing at steps 100 to 109 is registered and stored in the storage medium (not illustrated), such as a RAM or a hard disk, which is included in the travel amount estimation apparatus 10. Accordingly, these pieces of information can be used as necessary in later processing. The registered information when a single-lens camera is used as the external sensor 20 is, for example, captured images acquired as the sensor information at step 103, image feature points extracted at step 106, and an error cause determined at step 108. Note that the information registered at step 110 is not limited thereto. Optional information may be registered and stored in the storage medium in accordance with the kind of the external sensor 20 and processing executed by the travel amount estimation apparatus 10.

At step 111, the corrected vehicle travel amount obtained at step 109 is output to the automatic parking system 40 as a result of estimation of the vehicle travel amount by the travel amount estimation apparatus 10. Note that the vehicle travel amount estimated by the travel amount estimation apparatus 10 is output to the automatic parking system 40 in the present embodiment but may be output to any other optional system.

According to the first embodiment of the present invention described above, it is possible to obtain effects described below.

(1) The travel amount estimation apparatus 10 includes the vehicle travel amount calculation unit 14, the sensor travel amount calculation unit 11, the vehicle information change point detection unit 15, the error cause determination unit 16, and the vehicle travel amount correction unit 17. The vehicle travel amount calculation unit 14 acquires the vehicle information 30 related to traveling of the own-vehicle (step 100), and calculates the vehicle travel amount indicating the travel amount of the own-vehicle based on the vehicle information 30 (step 101). The sensor travel amount calculation unit 11 acquires the sensor information related to the surrounding environment of the own-vehicle from the external sensor 20 (step 103), and calculates the sensor travel amount indicating the travel amount of the own-vehicle based on the sensor information (step 106). The vehicle information change point detection unit 15 detects, as a vehicle information change point, a situation in which error occurs to the vehicle travel amount based on the vehicle information 30 (step 102). The error cause determination unit 16 determines the error cause of the vehicle travel amount by using the vehicle information change point detected by the vehicle information change point detection unit 15 (step 108). The vehicle travel amount correction unit 17 corrects the vehicle travel amount by using the sensor travel amount in accordance with the error cause (step 109), and estimates the travel amount of the own-vehicle. In this manner, it is possible to prevent correction of the vehicle travel amount based on a result of the estimation of the sensor travel amount including error, and thus it is possible to improve the accuracy of estimation of the travel amount of the own-vehicle.

(2) The external sensor 20 is, for example, a single-lens camera. The sensor travel amount calculation unit 11 executes the sensor travel amount calculation processing in FIG. 3, thereby acquiring, as the sensor information, images captured by the single-lens camera and calculating the sensor travel amount. In this manner, it is possible to calculate the sensor travel amount by using an inexpensive single-lens camera.

(3) The vehicle information change point detection unit 15 detects a vehicle information change point based on information of the steering wheel angle or acceleration amount of the own-vehicle. When no vehicle information change point is detected by the vehicle information change point detection unit 15 (No at step 300*a* and No at step 300*b*), the vehicle travel amount correction unit 17 estimates the travel amount of the own-vehicle without correction of the vehicle travel amount by using the sensor travel amount. In this manner, it is possible to prevent correction of the vehicle travel amount from being performed although the correction is unnecessary in a situation in which no error occurs to the vehicle travel amount.

(4) The vehicle information change point detection unit 15 detects, as a vehicle information change point based on information of the steering wheel angle or acceleration amount of the own-vehicle, any one or both of a situation in which the own-vehicle is turning and a situation in which the own-vehicle has traveled over a level difference. The error cause determination unit 16 determines an error cause based on a result of the detection of the vehicle information change point by the vehicle information change point detection unit 15 (steps 300*a* and 300*b*). The vehicle travel amount correction unit 17 corrects the vehicle travel amount input from the vehicle travel amount calculation unit 14 based on the information of the sensor travel amount in accordance with the error cause input from the error cause determination unit 16. In this manner, it is possible to reliably determine an error cause in a situation in which error is likely to occur the vehicle travel amount, and accurately perform correction of the vehicle travel amount.

(5) The vehicle information change point detection unit 15 detects, as a vehicle information change point, any one or both of a situation in which the own-vehicle is turning and a situation in which the own-vehicle has traveled over a level difference (step 102). In this manner, it is possible to detect, as a vehicle information change point, a turn situation and a level difference travel-over situation in which error is likely to occur to the vehicle travel amount.

(6) The vehicle information 30 may include at least one of the steering wheel angle and acceleration amount of the own-vehicle. The vehicle information change point detection unit 15 detects a vehicle information change point based on any one or both of the steering wheel angle and acceleration amount of the own-vehicle. In this manner, when a turn situation or a level difference travel-over situation, in which error is likely to occur to the vehicle travel amount, has occurred, it is possible to reliably detect the situation as a vehicle information change point.

(7) The travel amount estimation apparatus 10 further includes the reliability calculation unit 12 configured to calculate the reliability of the sensor travel amount. The error cause determination unit 16 determines, based on a result of the detection of a vehicle information change point and the reliability of the sensor travel amount, whether correction of the vehicle travel amount by using the sensor travel amount by the vehicle travel amount correction unit 17 is possible (steps 300*a*, 301*a*, 300*b*, and 301*b*). In this manner, it is possible to appropriately determine whether correction of the vehicle travel amount by using the sensor travel amount possible.

(8) The vehicle travel amount calculation unit 14 calculates the vehicle travel amount by using a plurality of parameters. The vehicle travel amount correction unit 17 corrects, by using the sensor travel amount, a parameter in accordance with an error cause among the plurality of parameters, and corrects the vehicle travel amount by causing the vehicle travel amount calculation unit 14 to recalculate the vehicle travel amount by using the corrected parameter. In this manner, it is possible to appropriately correct the vehicle travel amount by using the sensor travel amount.

(9) The travel amount estimation apparatus 10 further includes the sensor information change point detection unit 13 configured to detect a situation in which change of the sensor information is large as a sensor information change point. When a sensor information change point is detected by the sensor information change point detection unit 13 (Yes at step 105), the sensor travel amount calculation unit 11 does not perform the processing at step 106 nor calculate the sensor travel amount. In this manner, when a correct calculation result cannot be calculated for the sensor travel amount and thus the vehicle travel amount cannot be appropriately corrected, unnecessary calculation processing of the sensor travel amount is not performed, thereby reducing a processing load.

(10) The external sensor 20 is, for example, a camera. The sensor information change point detection unit 13 can detect a sensor information change point based on luminance change through images captured by the camera (step 104). In this manner, it is possible to reliably detect, as a sensor information change point, a situation in which accurate estimation of the sensor travel amount cannot be performed as in abrupt change of the illumination condition at image capturing when a camera is used as the external sensor 20.

Second Embodiment

Subsequently, a second embodiment of the present invention will be described below. In the first embodiment described above, an example in which a single-lens camera is used as the external sensor 20 is described. However, a stereo camera may be used as the external sensor 20, and calculation of the sensor travel amount may be performed by using, as the sensor information, stereo images captured by the stereo camera. In the present embodiment, an example in which a stereo camera is used as the external sensor 20 is described. Note that the configuration of the travel amount estimation apparatus 10 according to the present embodiment is same as the configuration in FIG. 1 described in the first embodiment.

When a stereo camera is used as the external sensor 20, the processing at steps 103, 104, 106, and 107 in the flowchart in FIG. 2 described in the first embodiment is changed as described below in the travel amount estimation apparatus 10.

In the present embodiment, since stereo images are used, pairs of two images need to be acquired as the sensor information. Thus, at step 103, the travel amount estimation apparatus 10 acquires, as the sensor information, captured images from a pair of cameras mounted as the external sensor 20 on the own-vehicle.

At step 104, the sensor information change point detection unit 13 performs, on the images acquired at step 103, sensor information change point detection same as that performed on a single-lens image in the first embodiment. As a result, when abrupt change occurs to either image, this situation is detected as a sensor information change point. In addition, when the average luminance value is largely different between the pair of images, this situation is detected as a sensor information change point. This prevents estimation of the sensor travel amount from being performed by using an image that is captured by one of the cameras and to which overexposure occurs, for example, when light is incident only on the camera.

At step 106, the sensor travel amount calculation unit 11 calculates the sensor travel amount by a travel amount estimation method different from that when a single-lens image is used in the first embodiment. In this process, calculation of the sensor travel amount is performed in accordance with, for example, a flowchart illustrated in FIG. 9.

First, at step 200B, the sensor travel amount calculation unit 11 calculates parallax (distance information) by triangulation from the pair of images read at step 103. This parallax calculation may be performed by using, for example, the well-known technologies of a block matching method and a semi global matching method.

Subsequently, at step 201B, the sensor travel amount calculation unit 11 estimates the travel amount of each camera. In this process, the travel amount of each camera is estimated by calculating relative travel amount with respect to distance data stored at step 110 in processing of the previous period, by using pixels (three-dimensional feature points) including the distance information calculated at step 200B. The three-dimensional feature points can be handled similarly to distance data acquired from a distance sensor such as a LiDAR or a radar. Thus, the travel amount of each camera can be calculated from the three-dimensional feature points by a well-known method, such as iterative closest point (ICP) or normal distributions transform (NDT), which calculates a coordinate transform equation through rigid-body transformation between distance data. Alternatively, the three-dimensional feature points may be associated by a feature point association method using a single-lens image as described in the first embodiment or a well-known association method using a feature amount based on a three-dimensional shape, such as a SHOT feature amount, and rigid-body transformation may be calculated by utilizing singular value decomposition based on a result of the association. Any other optional method may be used to estimate the travel amount of each camera from the distance information calculated at step 200B.

Figure 9:
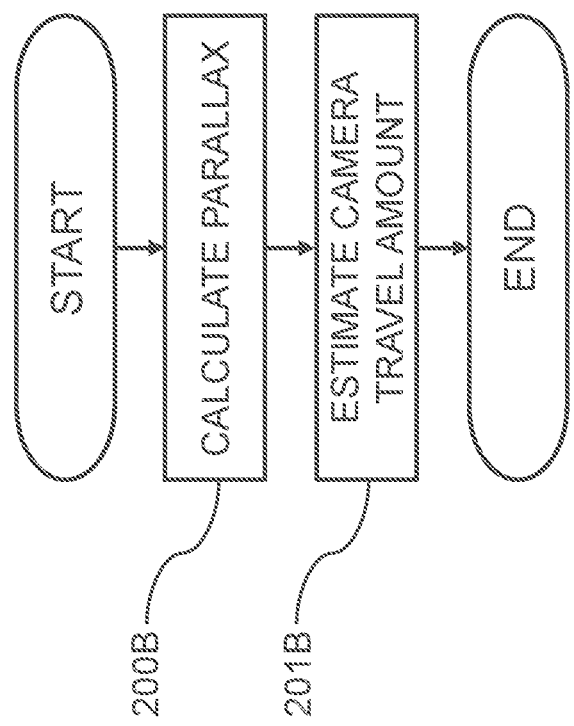
FIG. 9 is a flowchart of the sensor travel amount calculation processing according to a second embodiment of the present invention.

After the travel amount of each camera is estimated at step 201B, the sensor travel amount calculation unit 11 outputs a result of the estimation as a calculation result of the sensor travel amount and ends the sensor travel amount calculation processing illustrated in the flowchart in FIG. 9.

At step 107, the reliability calculation unit 12 calculates the reliability of the sensor travel amount calculated by using stereo images by the sensor travel amount calculation unit 11 at step 106. In this process, the reliability of the sensor travel amount is calculated by using, for example, three indexes below.

The first index is the average of the distance between three-dimensional feature points closest to each other. When this average value is large, in other words, when three-dimensional feature points are separated from each other, it is thought that an appropriate coordinate transform equation cannot be obtained through rigid-body transformation. Thus, as the average of the distance between three-dimensional feature points is smaller, the reliability of the sensor travel amount can be determined to be higher. For example, in a case in which ICP of Point Cloud Library (PCL) as one point group processing library is used, the calculation result of the sensor travel amount can be determined to be reliable when the average of the distance between three-dimensional feature points is 0.02 to 0.3 inclusive, depending on the density of a three-dimensional point group.

The second index is the number of corresponding points when feature point association is performed. Specifically, it can be determined that the same object or area is more likely to exist in images as the number of corresponding points is larger, and thus the reliability of the calculation result of the sensor travel amount can be determined by using the number.

The third index is the number of three-dimensional feature points remaining unassociated. Specifically, substantially all three-dimensional feature points are associated when environments at two places for which a coordinate transform equation is to be calculated are similar to each other. However, the number of unassociated feature points increases when another vehicle or the like abruptly comes across in front of the own-vehicle or when there is a place at which distance cannot be obtained due to occlusion in an image. Thus, it can be determined that the reliability of the sensor travel amount is lower as the number of three-dimensional feature points unassociated in subsequent images is larger.

In the present embodiment, a reliability evaluation reference for each above-described index can be selected as appropriate in accordance with a method used in calculation of the sensor travel amount. The reliability may be calculated to be one or zero, depending on whether a condition is satisfied, as described in the first embodiment or may be set to be an arbitrary value between zero to one as appropriate.

According to the second embodiment of the present invention described above, the external sensor 20 is a stereo camera capable of acquiring three-dimensional distance data. The sensor travel amount calculation unit 11 executes the sensor travel amount calculation processing in FIG. 9, thereby acquiring three-dimensional distance data as the sensor information and calculating the sensor travel amount. In this manner, it is possible to accurately calculate the sensor travel amount.

Third Embodiment

Subsequently, a third embodiment of the present invention will be described below. In the second embodiment described above, an example in which a stereo camera is used as the external sensor 20 and stereo images captured by the stereo camera are used as the sensor information to acquire distance information and calculate the sensor travel amount is described. However, a distance sensor other than a stereo camera may be used as the external sensor 20 to acquire distance information. In the present embodiment, an example in which a LiDAR as a kind of distance sensor is used as the external sensor 20 is described. Note that the configuration of the travel amount estimation apparatus 10 according to the present embodiment is same as the configuration in FIG. 1 described in the first embodiment.

When a LiDAR is used as the external sensor 20, the processing at steps 103, 104, 106, and 107 in the flowchart in FIG. 2 described in the first embodiment is changed as described below in the travel amount estimation apparatus 10.

In the present embodiment, at step 103, the travel amount estimation apparatus 10 acquires, as the sensor information, distance information on circumference of the own-vehicle from the LiDAR mounted as the external sensor 20 on the own-vehicle. In this process, for example, three-dimensional distance data including height information from a road surface and configured of a plurality of layers is acquired as the sensor information.

At step 104, the sensor information change point detection unit 13 performs sensor information change point detection on the distance information acquired at step 103. For example, noise increase is a situation in which three-dimensional distance data measured by the LiDAR abruptly changes. Specifically, the LiDAR measures the distance to a measurement target object by laser irradiation. For example, when it is heavily raining during this measurement, small objects are sparsely falsely detected in the vicinity of the sensor and space because laser beams are reflected by rain. Thus, when small objects are detected in the vicinity of the sensor and space, this situation can be determined as a sensor information change point. However, the situation may not be detected as a sensor information change point because there are some well-known methods that remove these sparse noises through software processing.

At step 106, the sensor travel amount calculation unit 11 calculates the sensor travel amount by a travel amount estimation method same as that when stereo images are used as in the second embodiment. In this process, calculation of the sensor travel amount is performed in accordance with, for example, a flowchart illustrated in FIG. 10.

First, at step 200C, the sensor travel amount calculation unit 11 performs predetermined preprocessing. In this process, for example, processing of deleting unnecessary data in three-dimensional distance data acquired from the LiDAR is performed as the preprocessing.

Subsequently, at step 201C, the sensor travel amount calculation unit 11 estimates the travel amount of the LiDAR. In this process, similarly to step 201B in FIG. 9 described in the second embodiment, the travel amount of the LiDAR can be calculated from the three-dimensional distance data by a well-known method, such as iterative closest point (ICP) or normal distributions transform (NDT), which calculates a coordinate transform equation through rigid-body transformation between distance data.

Figure 10:
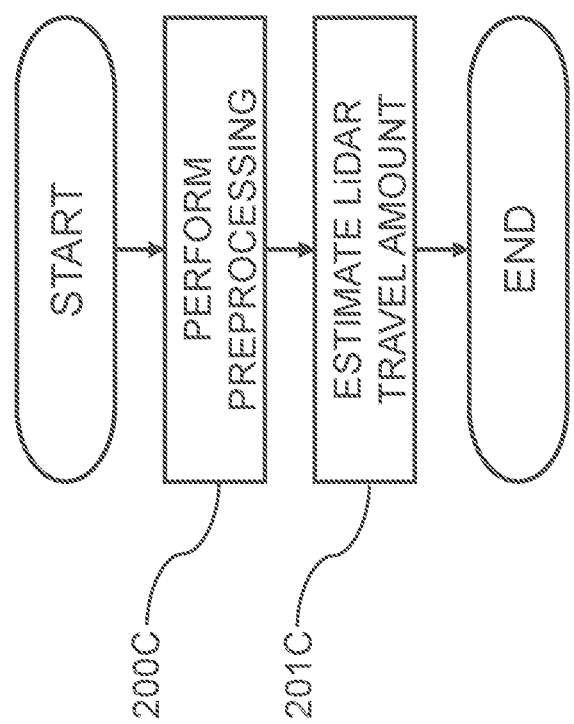
FIG. 10 is a flowchart of the sensor travel amount calculation processing according to a third embodiment of the present invention.

After the travel amount of the LiDAR is estimated at step 201C, the sensor travel amount calculation unit 11 outputs a result of the estimation as a calculation result of the sensor travel amount and ends the sensor travel amount calculation processing illustrated in the flowchart in FIG. 10.

At step 107, the reliability calculation unit 12 calculates the reliability of the sensor travel amount calculated by using the three-dimensional distance data by the sensor travel amount calculation unit 11 at step 106. In this process, the reliability of the sensor travel amount can be calculated by using, for example, the first and third indexes among the three indexes described in the second embodiment.

According to the third embodiment of the present invention described above, the external sensor 20 is a LiDAR capable of acquiring three-dimensional distance data. The sensor travel amount calculation unit 11 executes the sensor travel amount calculation processing in FIG. 10, thereby acquiring three-dimensional distance data as the sensor information and calculating the sensor travel amount. In this manner, similarly to the second embodiment, it is possible to accurately calculate the sensor travel amount.

Note that although, in the third embodiment described above, an example in which a LiDAR as a kind of distance sensor is used as the external sensor 20 is described, the present embodiment is also applicable to a case in which another distance sensor such as a radar is used.

Fourth Embodiment

Subsequently, a fourth embodiment of the present invention will be described below. In the first embodiment described above, an example in which the error cause of the vehicle travel amount is determined by the error cause determination unit 16, and when the sensor travel amount is determined to be reliable, the vehicle travel amount is corrected by replacing an optional parameter of the vehicle travel amount with the sensor travel amount is described. However, the vehicle travel amount may be corrected by the sensor travel amount by exploiting a framework of a probabilistic position estimation method such as a Kalman filter. In the present embodiment, an example in which the vehicle travel amount is corrected by using the Kalman filter is described. Note that the configuration of the travel amount estimation apparatus 10 according to the present embodiment is same as the configuration in FIG. 1 described in the first embodiment.

Figure 11:
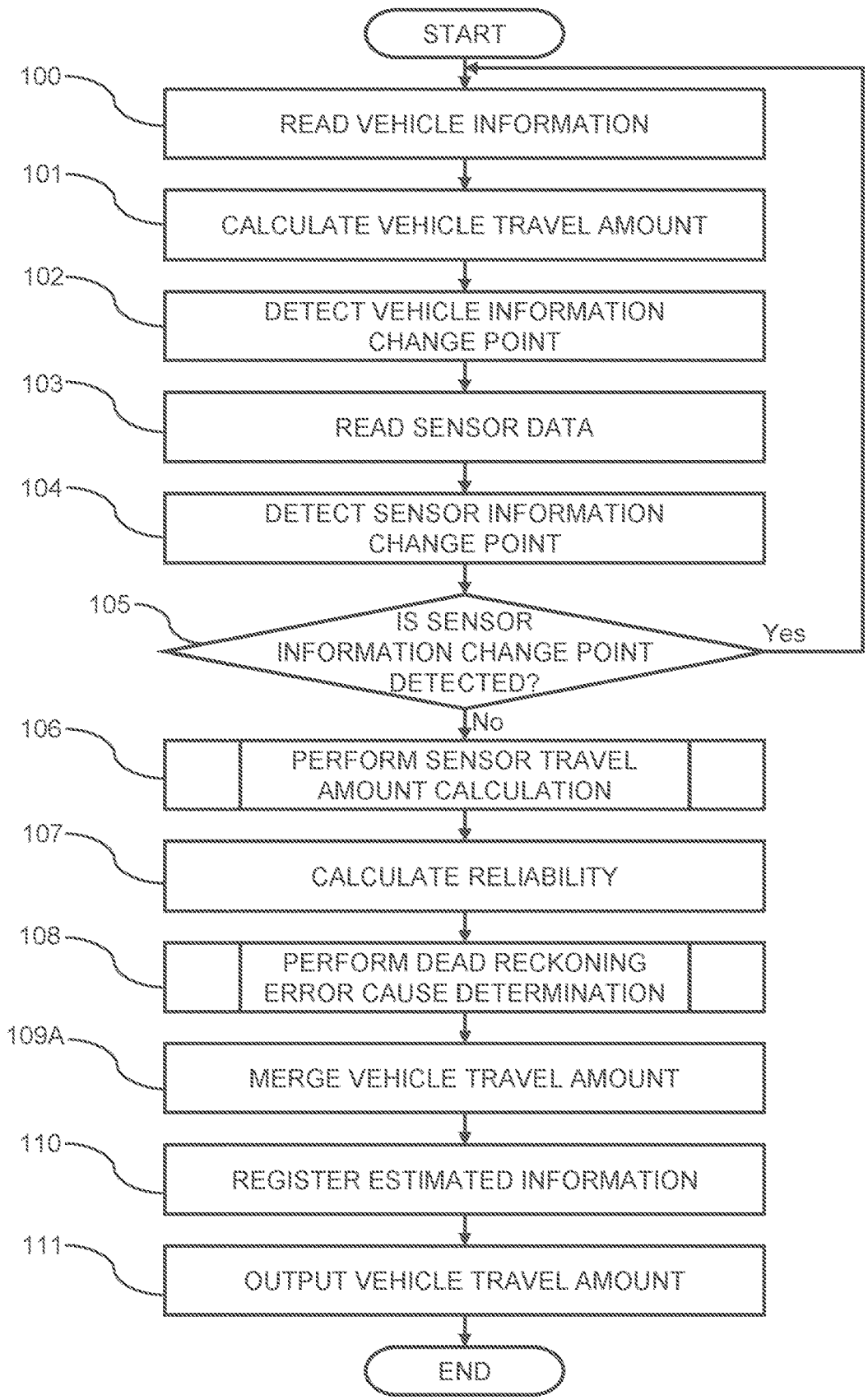
FIG. 11 is a flowchart illustrating the entire processing performed by the travel amount estimation apparatus according to a fourth embodiment of the present invention.

FIG. 11 is a flowchart illustrating the entire processing performed by the travel amount estimation apparatus 10 according to the fourth embodiment of the present invention. This flowchart is same as the flowchart in FIG. 2 described in the first embodiment except that processing at step 109 is replaced with step 109A. Thus, the following description will be made only on the contents of processing at step 109A and omit description of the other part of the flowchart in FIG. 11.

At step 109A, the vehicle travel amount correction unit 17 corrects the vehicle travel amount by merging the vehicle travel amount and the sensor travel amount by using the Kalman filter based on the error cause information table output from the error cause determination unit 16 at step 108. For example, when the vehicle posture is to be predicted, a corrected vehicle travel amount into which the vehicle travel amount and the sensor travel amount are merged can be obtained by inputting the vehicle travel amount and the sensor travel amount as observation values to the Kalman filter.

Note that, in some case, the sensor travel amount is not calculated at step 106 because a sensor information change point is detected at step 104 as described above, or the reliability calculated at step 107 for a calculation result of the sensor travel amount is low depending on the acquired sensor information. In such a case, adverse influence on prediction and update of the vehicle posture can be prevented by setting a Kalman gain of the sensor travel amount to be zero and using only the vehicle travel amount. When a vehicle information change point is detected at step 102, it is preferable that the reliability of an observation result of the vehicle information is determined to be low and the Kalman gain of the vehicle travel amount is reduced. With this method, it is possible to correct the vehicle travel amount with the sensor travel amount by using the Kalman filter.

According to the fourth embodiment of the present invention described above, the vehicle travel amount correction unit 17 inputs the vehicle travel amount and the sensor travel amount as observation values and corrects the vehicle travel amount through the Kalman filter using these observation values (step 109A). In this manner, it is possible to more flexibly perform correction of the vehicle travel amount by using the sensor travel amount.

Although the embodiments of the present invention are described above, the present invention is not limited to the above-described embodiments but may be changed in various kinds of manners without departing from the scope of the claims. For example, although the travel amount estimation apparatus 10 used in combination with the automatic parking system 40 is described above in the embodiments, the present invention is also applicable to a travel amount estimation apparatus used in another system. The above-described embodiments are merely detailed description of the present invention, and all described configurations do not necessarily need to be included. A configuration of another embodiment may be added to another configuration. Some configurations may be added, deleted, and replaced.

The above-described embodiments and modifications are merely exemplary, and the present invention is not limited to these contents as long as characteristics of the invention are maintained. Although various kinds of embodiments and modifications are described above, the present invention is not limited to these contents. Any other aspect that is thought of within the range of the technical idea of the present invention is included in the range of the present invention.

The entire contents of the following priority application are hereby incorporated by reference:

Japanese Patent Application No. 2018-244190 (filed on Dec. 27, 2018)

REFERENCE SIGNS LIST 10 travel amount estimation apparatus
11 sensor travel amount calculation unit
12 reliability calculation unit
13 sensor information change point detection unit
14 vehicle travel amount calculation unit
15 vehicle information change point detection unit
16 error cause determination unit
17 vehicle travel amount correction unit
20 external sensor
30 vehicle information
40 automatic parking system

The invention claimed is:

1. A travel amount estimation apparatus comprising:
a vehicle travel amount calculation unit configured to acquire vehicle information related to traveling of a vehicle and to calculate a vehicle travel amount indicating a travel amount of the vehicle based on the vehicle information;
a sensor travel amount calculation unit configured to acquire sensor information related to a surrounding environment of the vehicle from an external sensor and to calculate a sensor travel amount indicating the travel amount of the vehicle based on the sensor information;
a vehicle information change point detection unit configured to detect a vehicle information change point corresponding to a situation in which an error in the vehicle travel amount is likely to occur, the vehicle information change point is detected based on the vehicle information;
an error cause determination unit configured to determine an error cause of the vehicle travel amount corresponding to the vehicle information change point, the error cause is determined in response to the vehicle information change point detection unit detecting the vehicle information change point; and
a vehicle travel amount correction unit configured to correct the vehicle travel amount by using the sensor travel amount in accordance with the error cause and to estimate the travel amount of the vehicle based on the corrected vehicle travel amount,
wherein when the error cause determination unit determines that the error cause of the vehicle travel amount is a turn, the vehicle travel amount correction unit corrects a rotation amount of the vehicle, which is calculated based on the vehicle information, by using the sensor travel amount, and
wherein the travel amount estimation apparatus provides the estimated travel amount of the vehicle to a system that controls movement of the vehicle based on the estimated travel amount of the vehicle.

2. The travel amount estimation apparatus according to claim 1, wherein the vehicle information change point detection unit detects the vehicle information change point based on information of a steering wheel angle or an acceleration amount of the vehicle, and when the vehicle information change point is not detected by the vehicle information change point detection unit, the vehicle travel amount correction unit estimates the travel amount of the vehicle without correction of the vehicle travel amount by using the sensor travel amount.

3. The travel amount estimation apparatus according to claim 1, wherein the vehicle information change point detection unit detects, as the vehicle information change point, any one or both of a situation in which the vehicle is turning and a situation in which the vehicle has traveled over a level difference based on information of a steering wheel angle or an acceleration amount of the vehicle, the error cause determination unit determines the error cause based on a result of the detection of the vehicle information change point by the vehicle information change point detection unit, and the vehicle travel amount correction unit corrects the vehicle travel amount input from the vehicle travel amount calculation unit based on information of the sensor travel amount in accordance with the error cause input from the error cause determination unit.

4. A travel amount estimation apparatus comprising:

a vehicle travel amount calculation unit configured to acquire vehicle information related to traveling of a vehicle and to calculate a vehicle travel amount indicating a travel amount of the vehicle based on the vehicle information;

a sensor travel amount calculation unit configured to acquire sensor information related to a surrounding environment of the vehicle from an external sensor and to calculate a sensor travel amount indicating the travel amount of the vehicle based on the sensor information;

a vehicle information change point detection unit configured to detect a vehicle information change point corresponding to a situation in which an error in the vehicle travel amount is likely to occur, the vehicle information change point is detected based on the vehicle information;

an error cause determination unit configured to determine an error cause of the vehicle travel amount corresponding to the vehicle information change point, the error cause is determined in response to the vehicle information change point detection unit detecting the vehicle information change point; and a vehicle travel amount correction unit configured to correct the vehicle travel amount by using the sensor travel amount in accordance with the error cause and to estimate the travel amount of the vehicle based on the corrected vehicle travel amount, wherein when the error cause determination unit determines that the error cause of the vehicle travel amount is a level difference travel-over, the vehicle travel amount correction unit corrects the travel amount of the vehicle, which is calculated based on the vehicle information, by using the sensor travel amount, and wherein the travel amount estimation apparatus provides the estimated travel amount of the vehicle to a system that controls movement of the vehicle based on the estimated travel amount of the vehicle.

5. The travel amount estimation apparatus according to claim 4, wherein the vehicle information change point detection unit detects the vehicle information change point based on information of a steering wheel angle or an acceleration amount of the vehicle, and when the vehicle information change point is not detected by the vehicle information change point detection unit, the vehicle travel amount correction unit estimates the travel amount of the vehicle without correction of the vehicle travel amount by using the sensor travel amount.

6. The travel amount estimation apparatus according to claim 4, wherein the vehicle information change point detection unit detects, as the vehicle information change point, any one or both of a situation in which the vehicle is turning and a situation in which the vehicle has traveled over a level difference based on information of a steering wheel angle or an acceleration amount of the vehicle, the error cause determination unit determines the error cause based on a result of the detection of the vehicle information change point by the vehicle information change point detection unit, and the vehicle travel amount correction unit corrects the vehicle travel amount input from the vehicle travel amount calculation unit based on information of the sensor travel amount in accordance with the error cause input from the error cause determination unit.

7. A travel amount estimation apparatus comprising:

a vehicle travel amount calculation unit configured to acquire vehicle information related to traveling of a vehicle and to calculate a vehicle travel amount indicating a travel amount of the vehicle based on the vehicle information;

a sensor travel amount calculation unit configured to acquire sensor information related to a surrounding environment of the vehicle from an external sensor and to calculate a sensor travel amount indicating the travel amount of the vehicle based on the sensor information;

a vehicle information change point detection unit configured to detect a vehicle information change point corresponding to a situation in which an error in the vehicle travel amount is likely to occur, the vehicle information change point is detected based on the vehicle information;

an error cause determination unit configured to determine an error cause of the vehicle travel amount corresponding to the vehicle information change point, the error cause is determined in response to the vehicle information change point detection unit detecting the vehicle information change point; and a vehicle travel amount correction unit configured to correct the vehicle travel amount by using the sensor travel amount in accordance with the error cause and to estimate the travel amount of the vehicle based on the corrected vehicle travel amount, further comprising a reliability calculation unit configured to calculate reliability of the sensor travel amount, wherein the external sensor is a single-lens camera, the sensor travel amount calculation unit acquires an image captured by the single-lens camera as the sensor information and calculates the sensor travel amount, the reliability calculation unit calculates the reliability of the sensor travel amount based on any of the number of same objects in a plurality of images acquired at a predetermined frame rate by the single-lens camera, a result of association of feature points obtained from the respective images, and a distance to an object in each image, and the error cause determination unit determines whether correction of the vehicle travel amount by using the sensor travel amount by the vehicle travel amount correction unit is possible based on the result of the detection of the vehicle information change point and the reliability of the sensor travel amount, and wherein the travel amount estimation apparatus provides the estimated travel amount of the vehicle to a system that controls movement of the vehicle based on the estimated travel amount of the vehicle.

8. The travel amount estimation apparatus according to claim 7, wherein the vehicle information change point detection unit detects the vehicle information change point based on information of a steering wheel angle or an acceleration amount of the vehicle, and when the vehicle information change point is not detected by the vehicle information change point detection unit, the vehicle travel amount correction unit estimates the travel amount of the vehicle without correction of the vehicle travel amount by using the sensor travel amount.

9. The travel amount estimation apparatus according to claim 7, wherein the vehicle information change point detection unit detects, as the vehicle information change point, any one or both of a situation in which the vehicle is turning and a situation in which the vehicle has traveled over a level difference based on information of a steering wheel angle or an acceleration amount of the vehicle, the error cause determination unit determines the error cause based on a result of the detection of the vehicle information change point by the vehicle information change point detection unit, and the vehicle travel amount correction unit corrects the vehicle travel amount input from the vehicle travel amount calculation unit based on information of the sensor travel amount in accordance with the error cause input from the error cause determination unit.

10. A travel amount estimation apparatus comprising:
a vehicle travel amount calculation unit configured to acquire vehicle information related to traveling of a vehicle and to calculate a vehicle travel amount indicating a travel amount of the vehicle based on the vehicle information;

a sensor travel amount calculation unit configured to acquire sensor information related to a surrounding environment of the vehicle from an external sensor and to calculate a sensor travel amount indicating the travel amount of the vehicle based on the sensor information;

a vehicle information change point detection unit configured to detect a vehicle information change point corresponding to a situation in which an error in the vehicle travel amount is likely to occur, the vehicle information change point is detected based on the vehicle information;

an error cause determination unit configured to determine an error cause of the vehicle travel amount corresponding to the vehicle information change point, the error cause is determined in response to the vehicle information change point detection unit detecting the vehicle information change point; and a vehicle travel amount correction unit configured to correct the vehicle travel amount by using the sensor travel amount in accordance with the error cause and to estimate the travel amount of the vehicle based on the corrected vehicle travel amount, wherein the vehicle travel amount calculation unit calculates the vehicle travel amount by using a plurality of parameters, and the vehicle travel amount correction unit corrects a parameter in accordance with the error cause among the plurality of parameters by using the sensor travel amount and corrects the vehicle travel amount by causing the vehicle travel amount calculation unit to recalculate the vehicle travel amount by using the corrected parameter, and wherein the travel amount estimation apparatus provides the estimated travel amount of the vehicle to a system that controls movement of the vehicle based on the estimated travel amount of the vehicle.

11. The travel amount estimation apparatus according to claim 10, wherein the vehicle information change point detection unit detects the vehicle information change point based on information of a steering wheel angle or an acceleration amount of the vehicle, and when the vehicle information change point is not detected by the vehicle information change point detection unit, the vehicle travel amount correction unit estimates the travel amount of the vehicle without correction of the vehicle travel amount by using the sensor travel amount.

* * * * *